US012102253B2

(12) United States Patent
Foxlee et al.

(10) Patent No.: US 12,102,253 B2
(45) Date of Patent: Oct. 1, 2024

(54) SOUS VIDE APPLIANCE

(71) Applicant: BREVILLE PTY LIMITED, Alexandria (AU)

(72) Inventors: Brendan Foxlee, Alexandria (AU); Gregory Upston, Alexandria (AU); Lichan Meng, Alexandria (AU); Marian Silviu Rosian, Alexandria (AU); Vyvyan Rose, Alexandria (AU); William Shen, Alexandria (AU)

(73) Assignee: BREVILLE PTY LIMITED, Alexandria (AU)

( * ) Notice: Subject to any disclaimer, the term of this patent is extended or adjusted under 35 U.S.C. 154(b) by 937 days.

(21) Appl. No.: 17/042,906

(22) PCT Filed: Mar. 29, 2019

(86) PCT No.: PCT/AU2019/050280
§ 371 (c)(1),
(2) Date: Sep. 28, 2020

(87) PCT Pub. No.: WO2019/183682
PCT Pub. Date: Oct. 3, 2019

(65) Prior Publication Data
US 2021/0052102 A1    Feb. 25, 2021

(30) Foreign Application Priority Data

Mar. 29, 2018    (AU) ............................. 2018901051
Jun. 27, 2018    (AU) ............................. 2018902304

(51) Int. Cl.
*A47J 27/10*      (2006.01)
*A47J 27/00*      (2006.01)

(52) U.S. Cl.
CPC ............ *A47J 27/10* (2013.01); *A47J 27/004* (2013.01)

(58) Field of Classification Search
CPC ...... A47J 27/004; A47J 27/10; A47J 36/2405; G01N 2033/0068; G01N 33/0006;
(Continued)

(56) References Cited

U.S. PATENT DOCUMENTS

| 2008/0179311 A1 | 7/2008 | Koro et al. |
| 2013/0220143 A1* | 8/2013 | Fetterman ............. A47J 36/321 99/330 |
| 2016/0192801 A1 | 7/2016 | Wu |

FOREIGN PATENT DOCUMENTS

| CN | 106133326 A | 11/2016 |
| CN | 106859286 A | 6/2017 |

(Continued)

OTHER PUBLICATIONS

International Search Report for Application No. PCT/AU2019/050280 mailing date Jun. 21, 2019.

*Primary Examiner* — Dana Ross
*Assistant Examiner* — Joseph W Iskra
(74) *Attorney, Agent, or Firm* — KDW FIRM PLLC

(57) ABSTRACT

There is disclosed herein a sous vide appliance (10) including: a tube (12) having longitudinally opposite first and second ends (14, 13), and providing a liquid flow path (26) having an inlet adjacent the first end (14), and an outlet adjacent the second end (13); a heating element (31) mounted adjacent the tube (12) to heat liquid passing along the flow path from the inlet to the outlet; an outer housing (11) within which the tube (12) is located; and a switch (32) located between the tube (12) and the housing (11) and operatively associated with the heating element (31) to provide for the delivery of electric power to the heating element (31).

23 Claims, 33 Drawing Sheets

(58) Field of Classification Search
CPC ........... G01N 33/0008; G01N 33/0016; G01N 33/0032; G01N 33/0062; G01N 33/007; G01N 7/10
USPC .......................................................... 99/331
See application file for complete search history.

(56) References Cited

FOREIGN PATENT DOCUMENTS

| | | | |
|---|---|---|---|
| EP | 2767159 A1 | | 8/2014 |
| WO | WO2004034742 | * | 4/2004 |
| WO | WO-2017/066692 A1 | | 4/2017 |

* cited by examiner

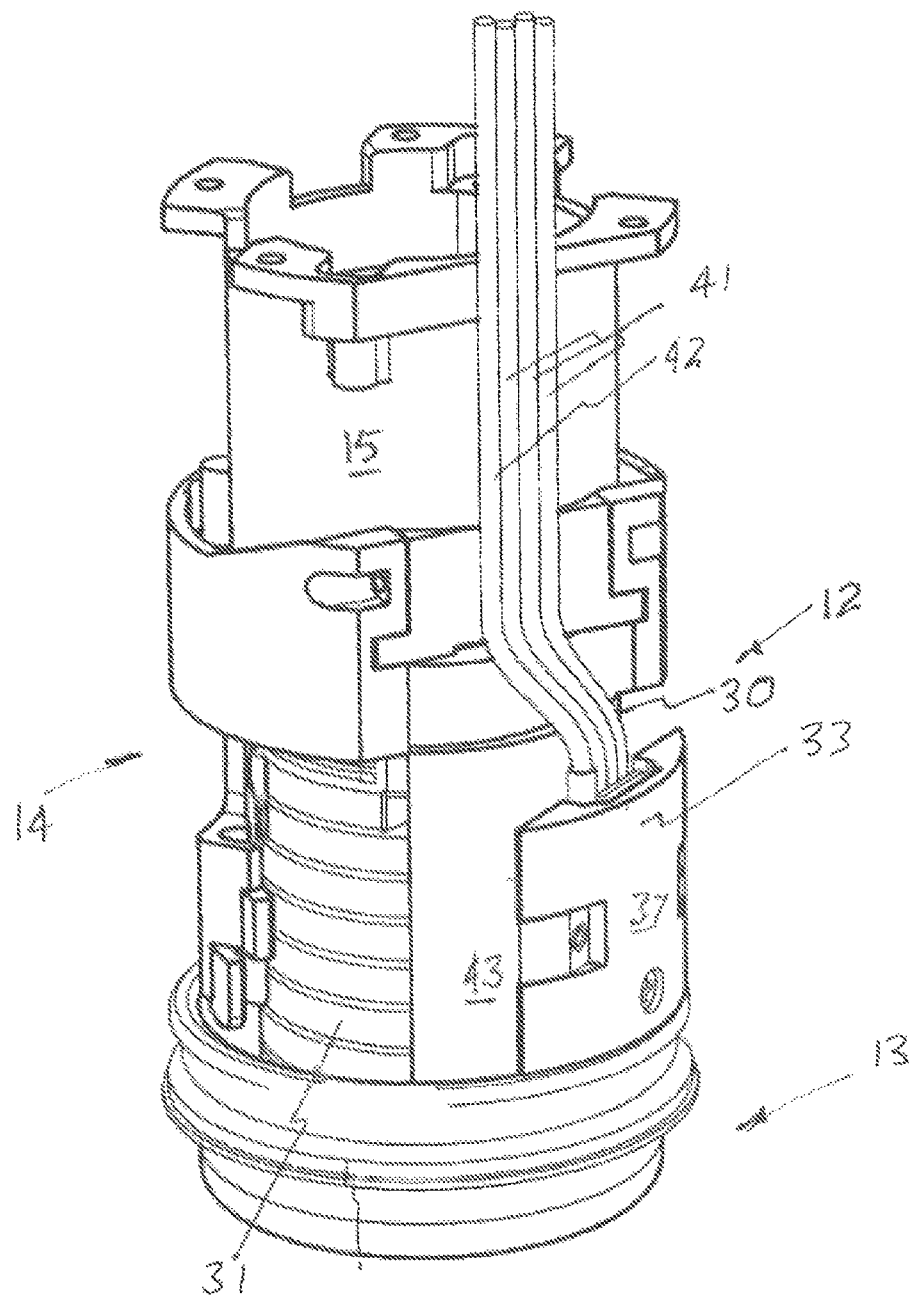

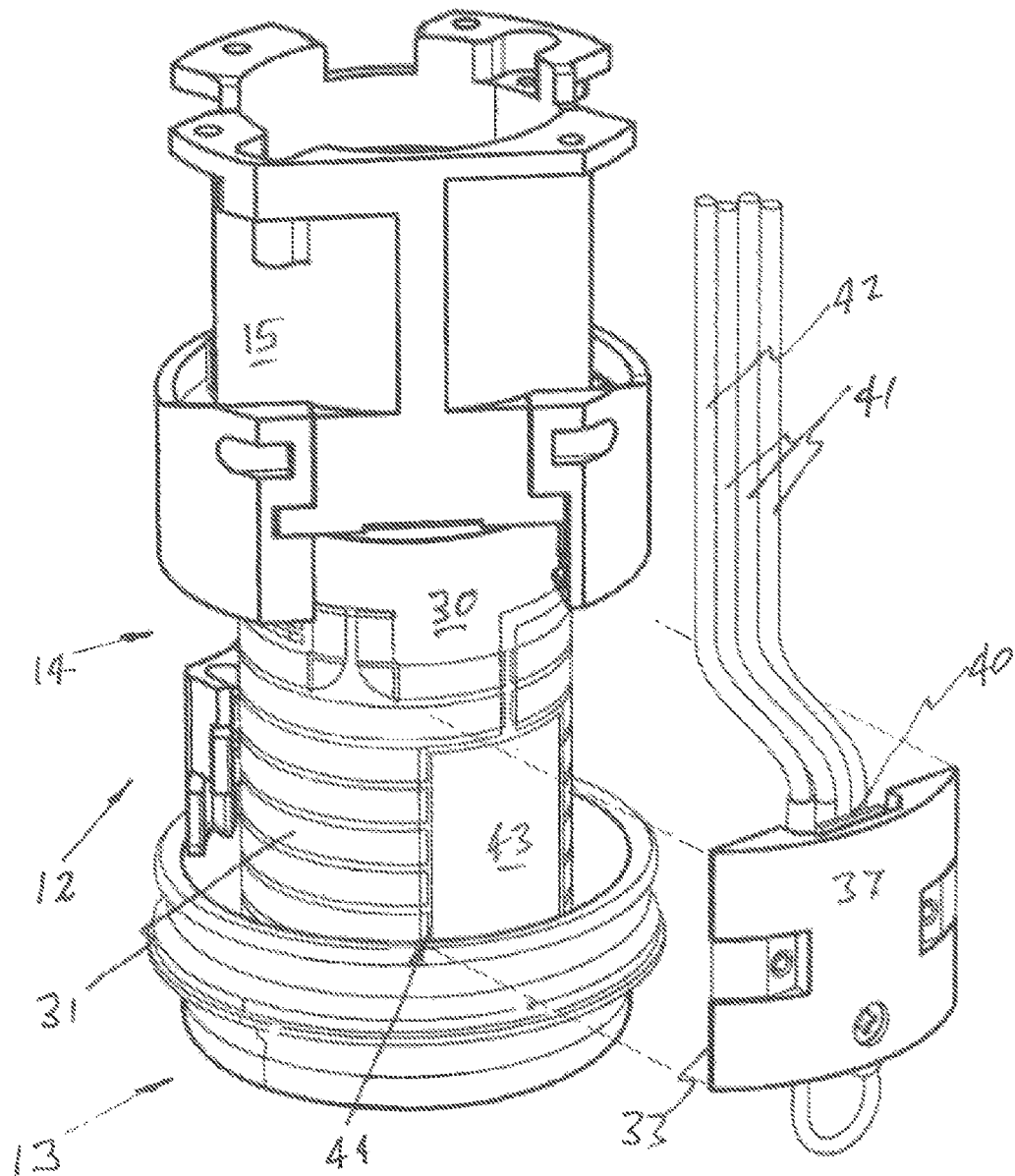

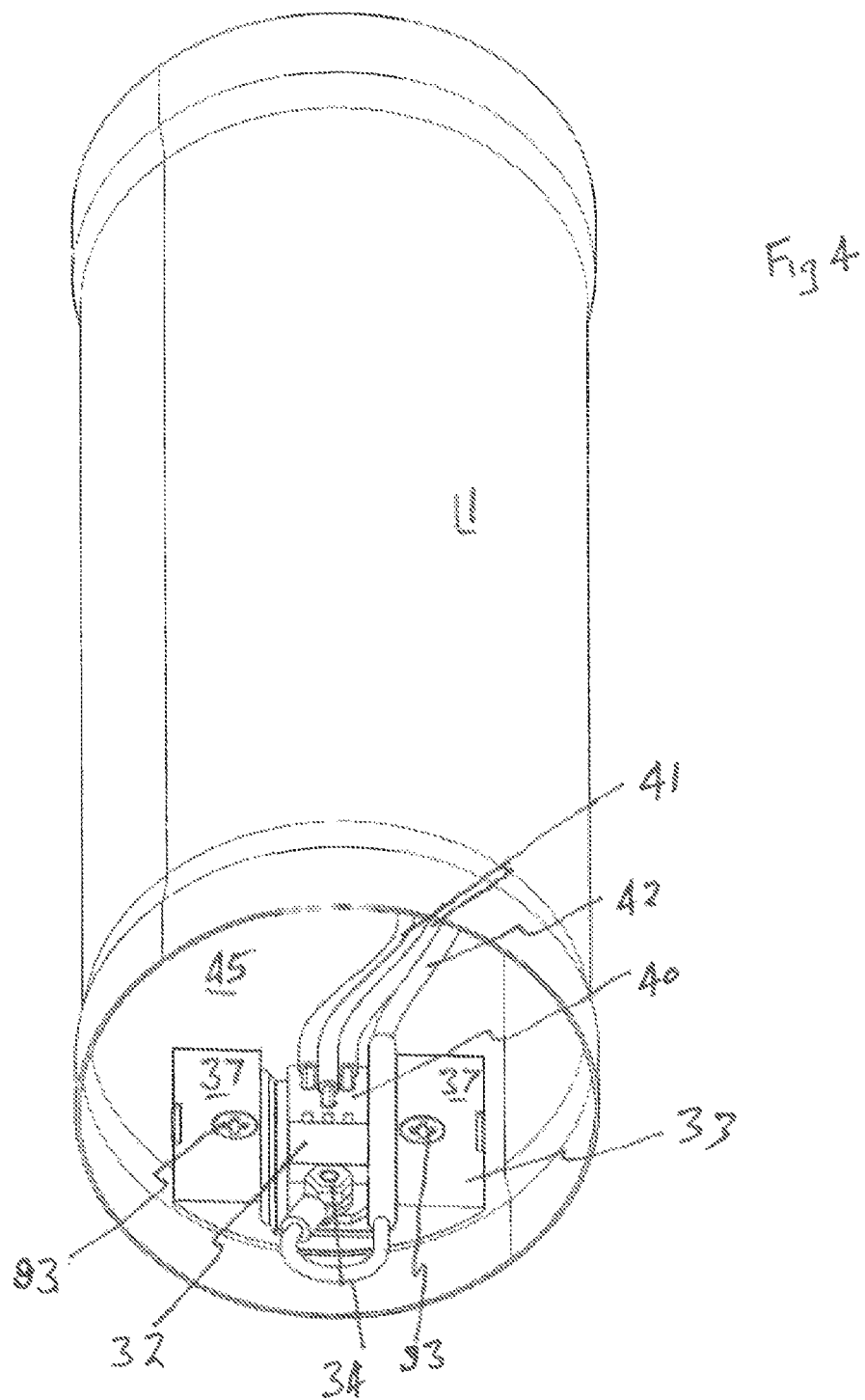

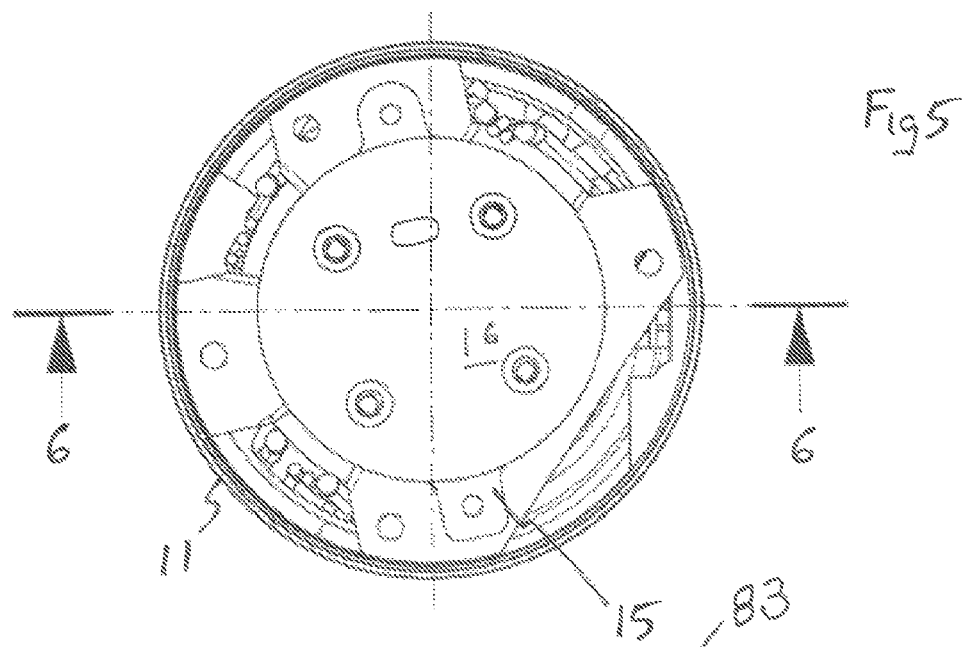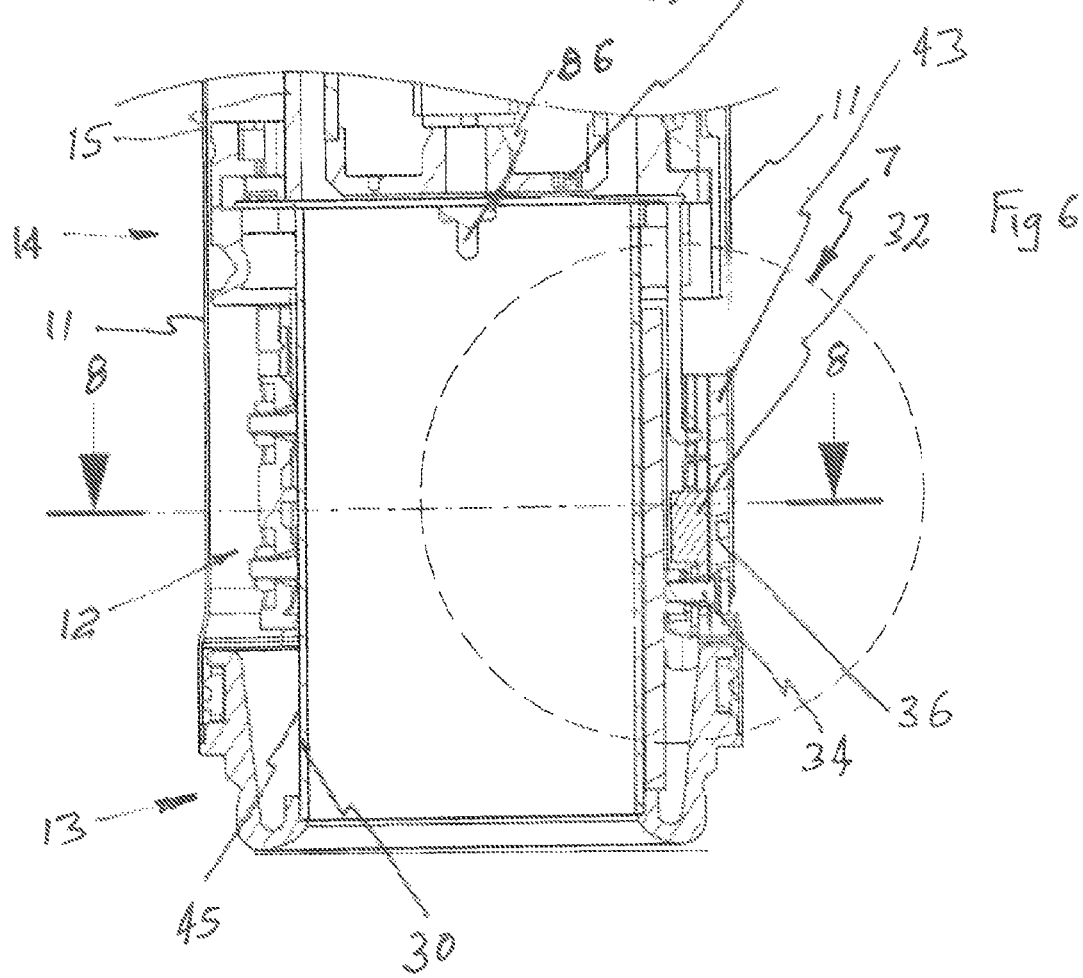

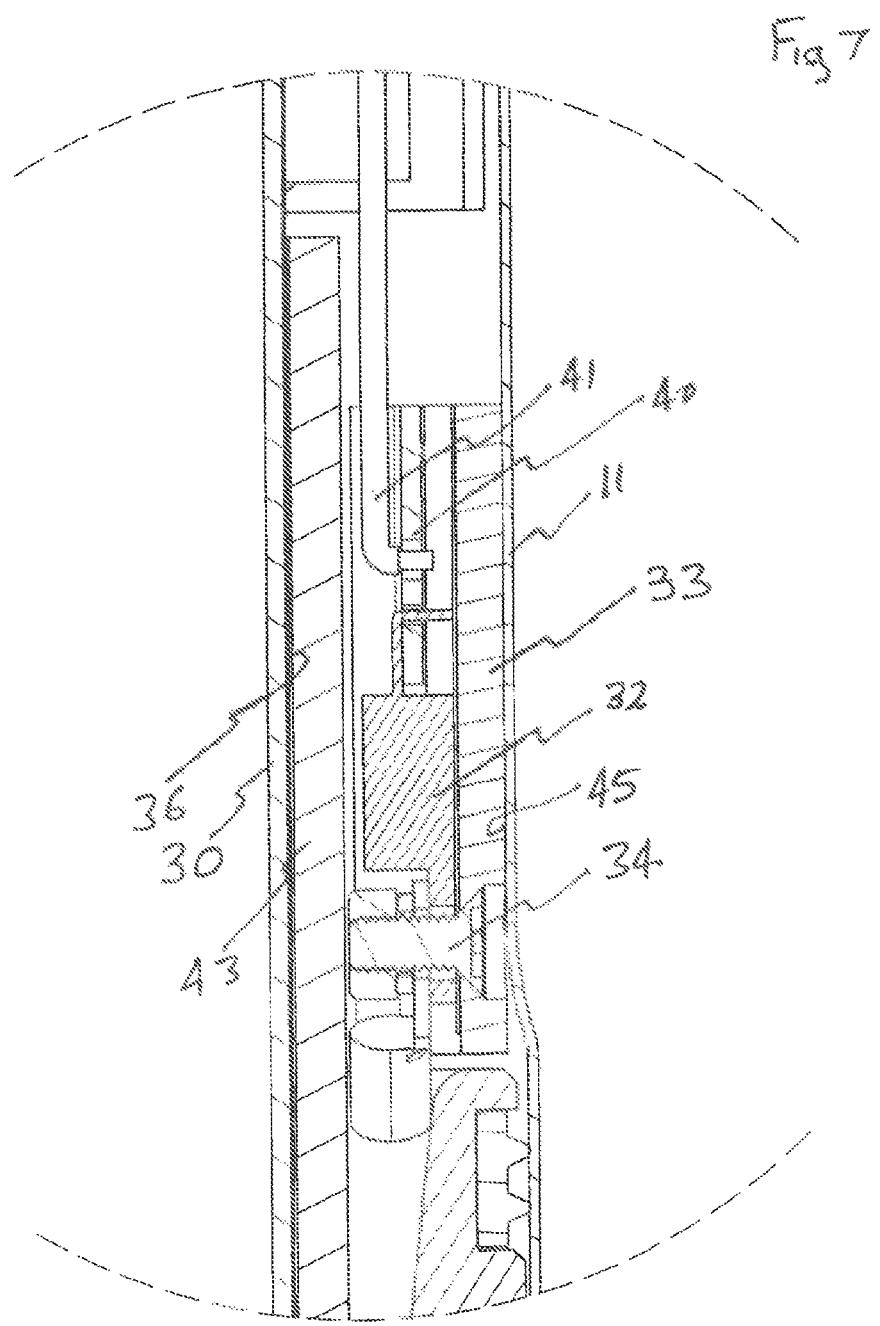

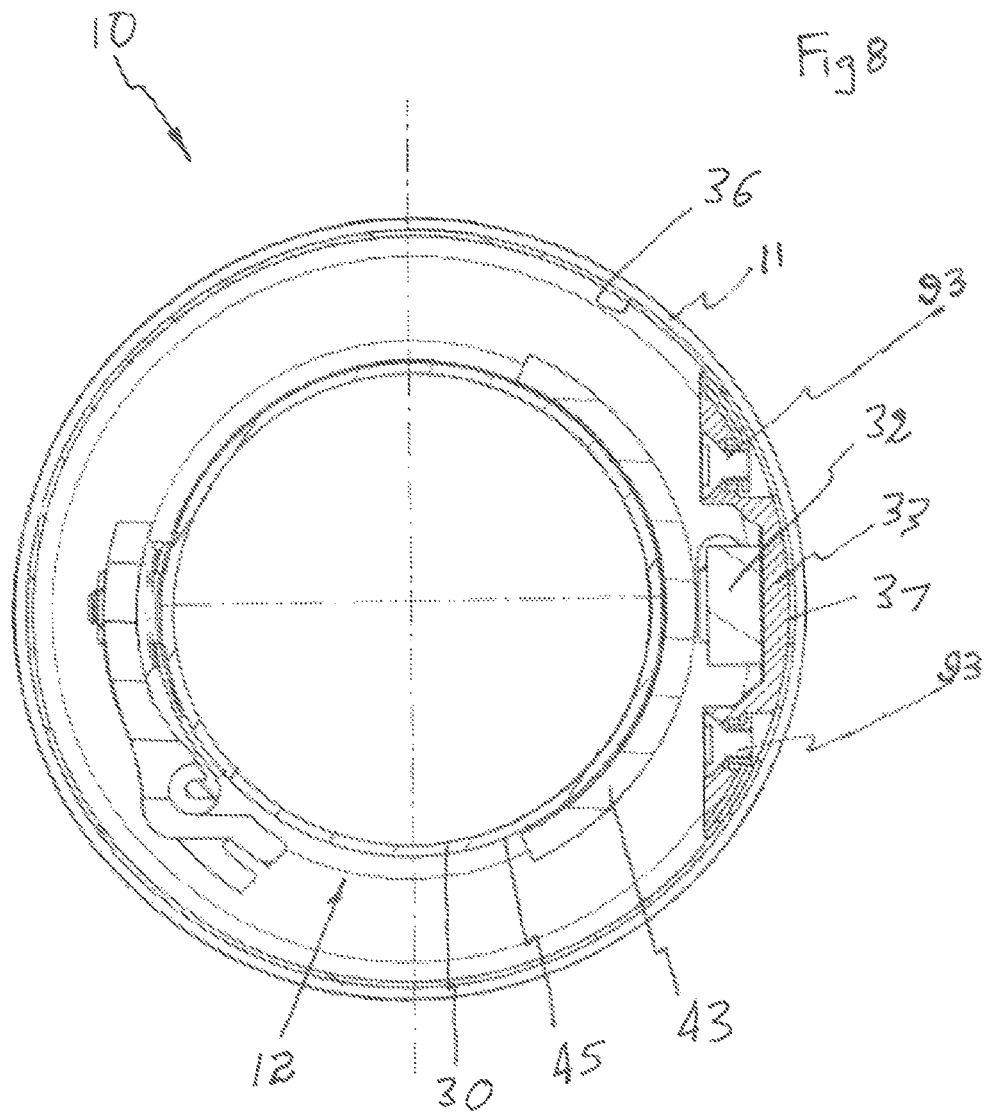

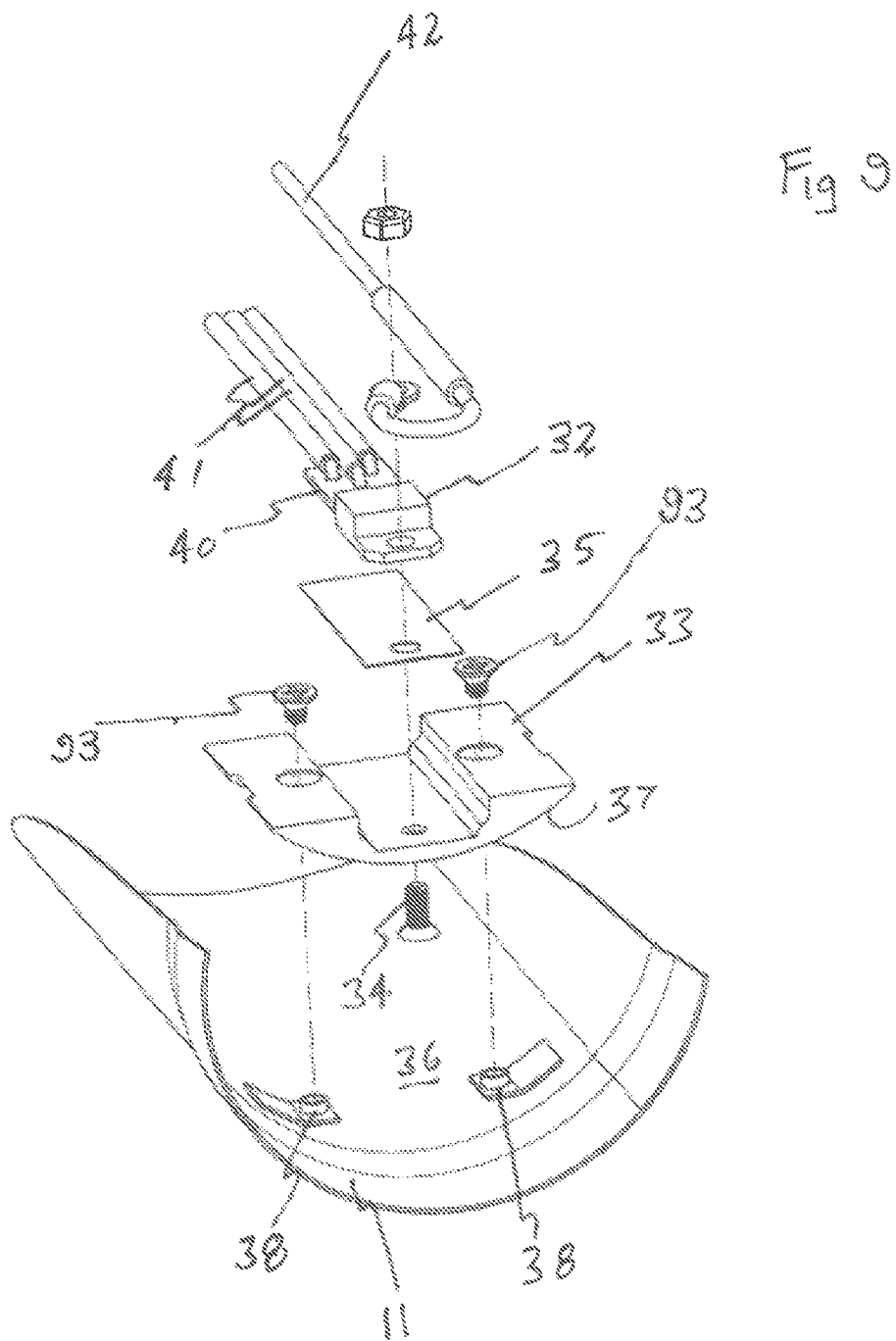

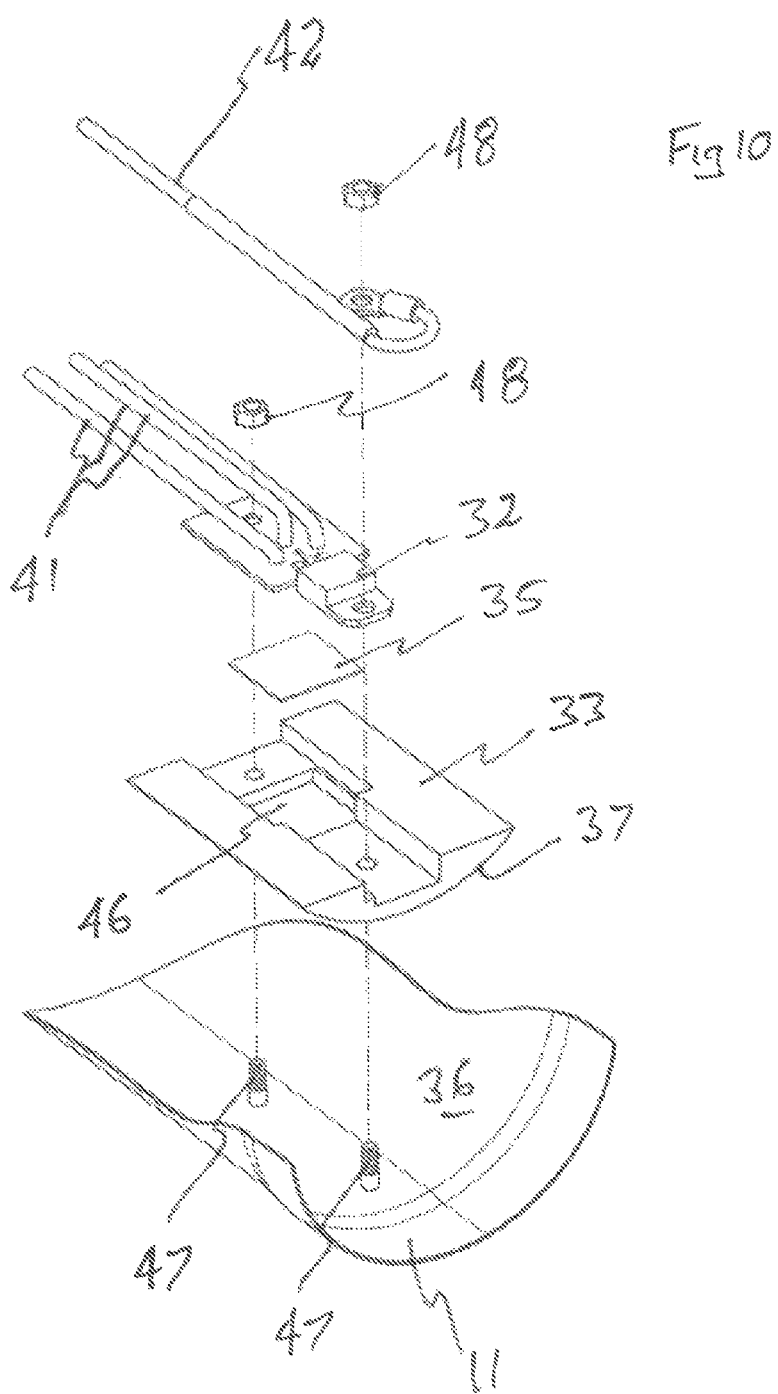

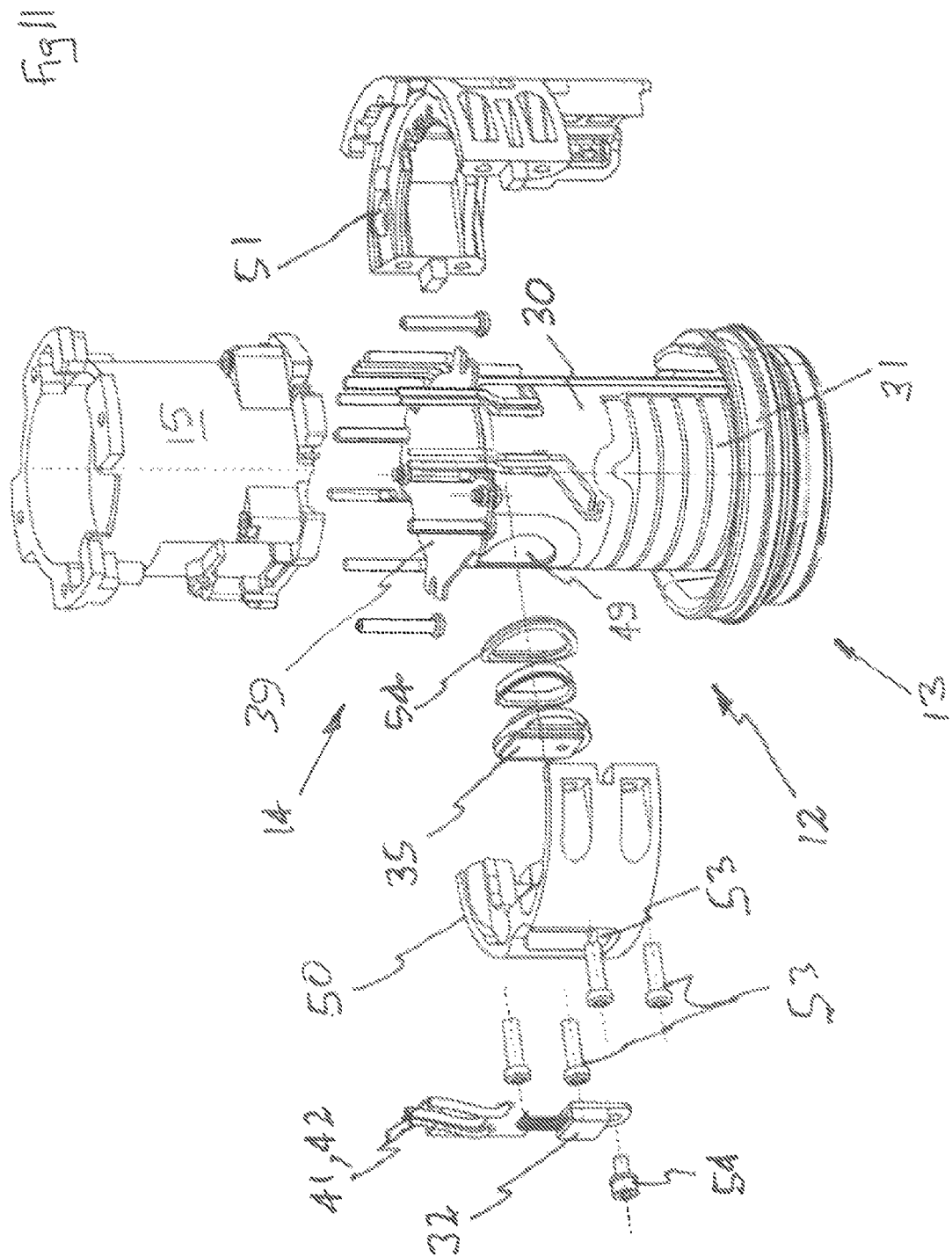

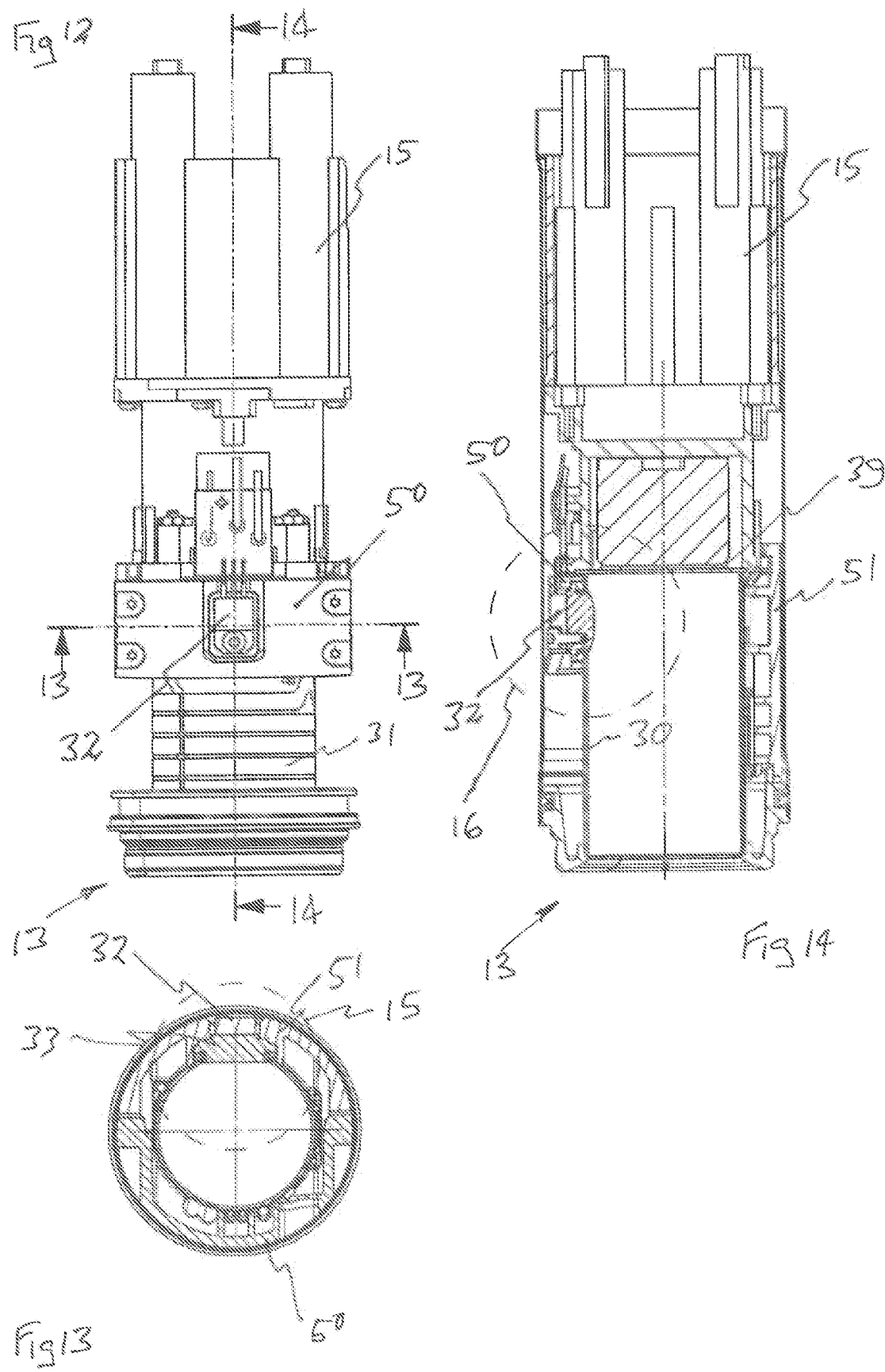

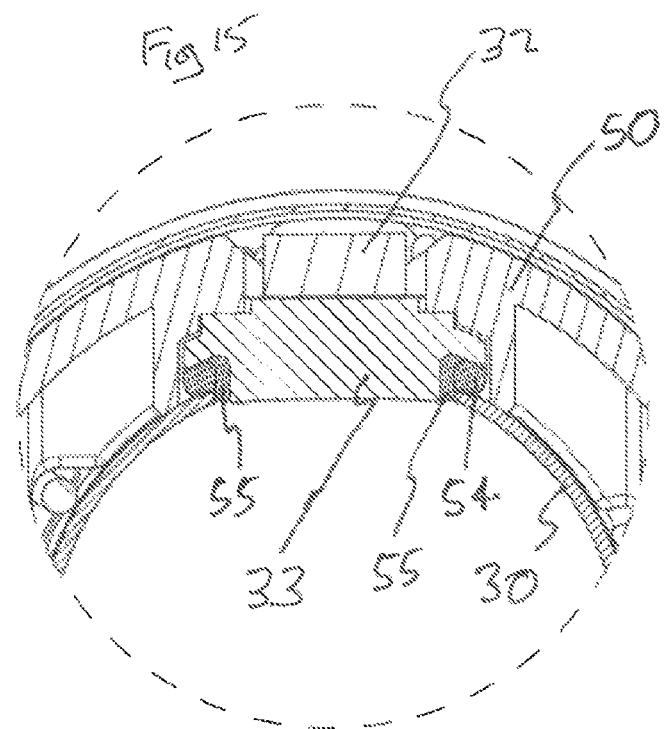
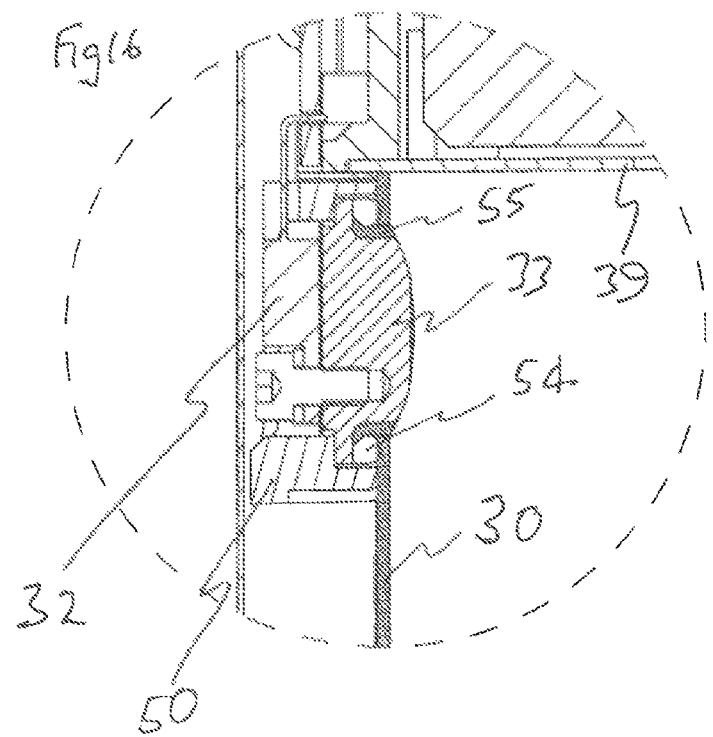

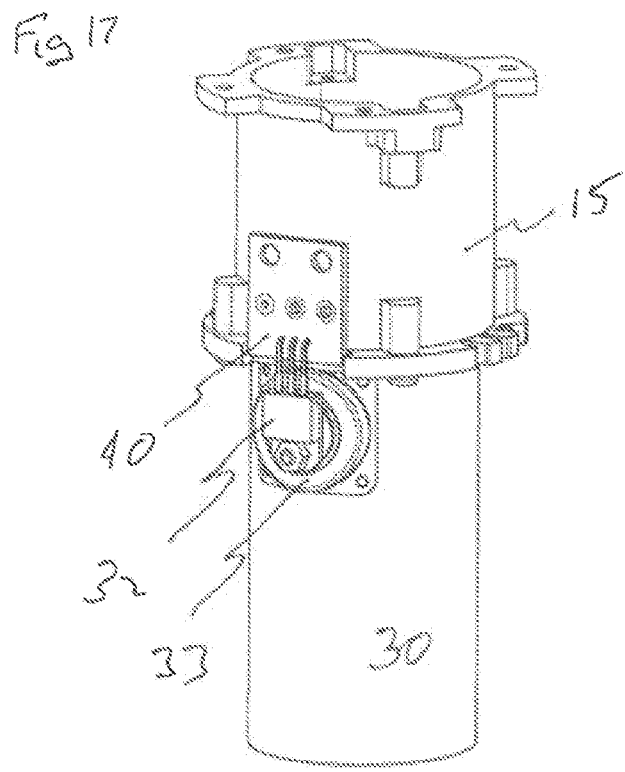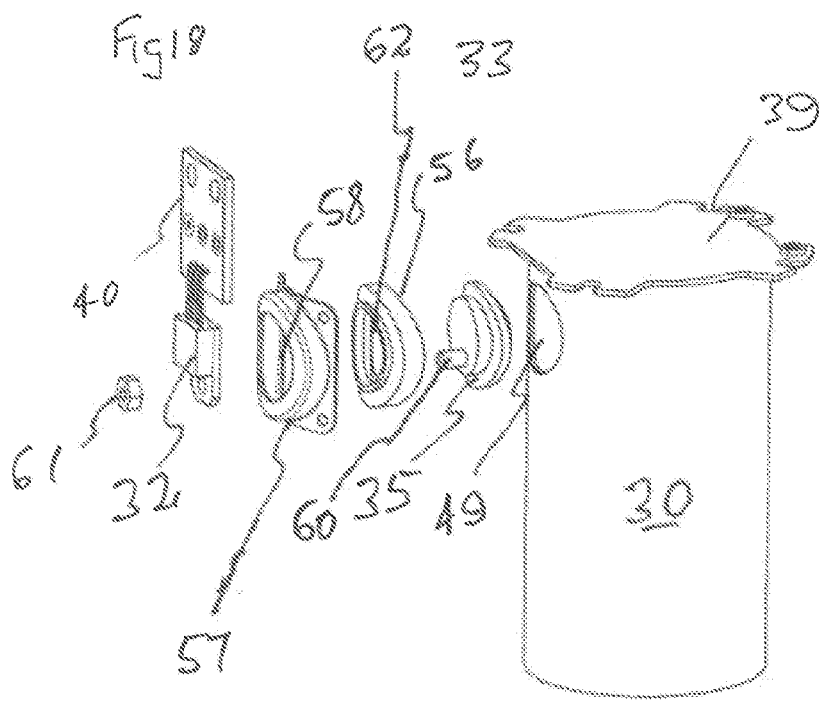

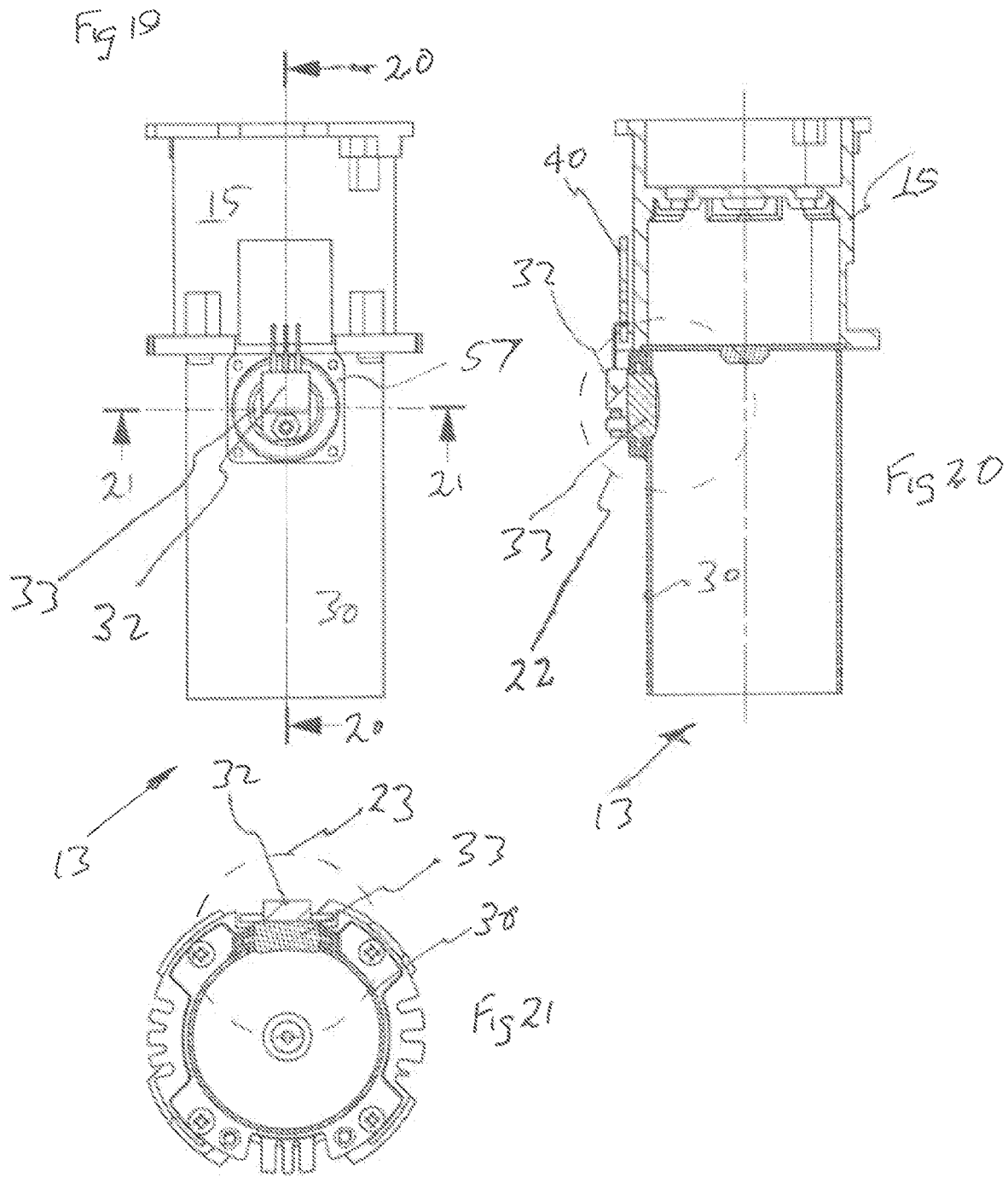

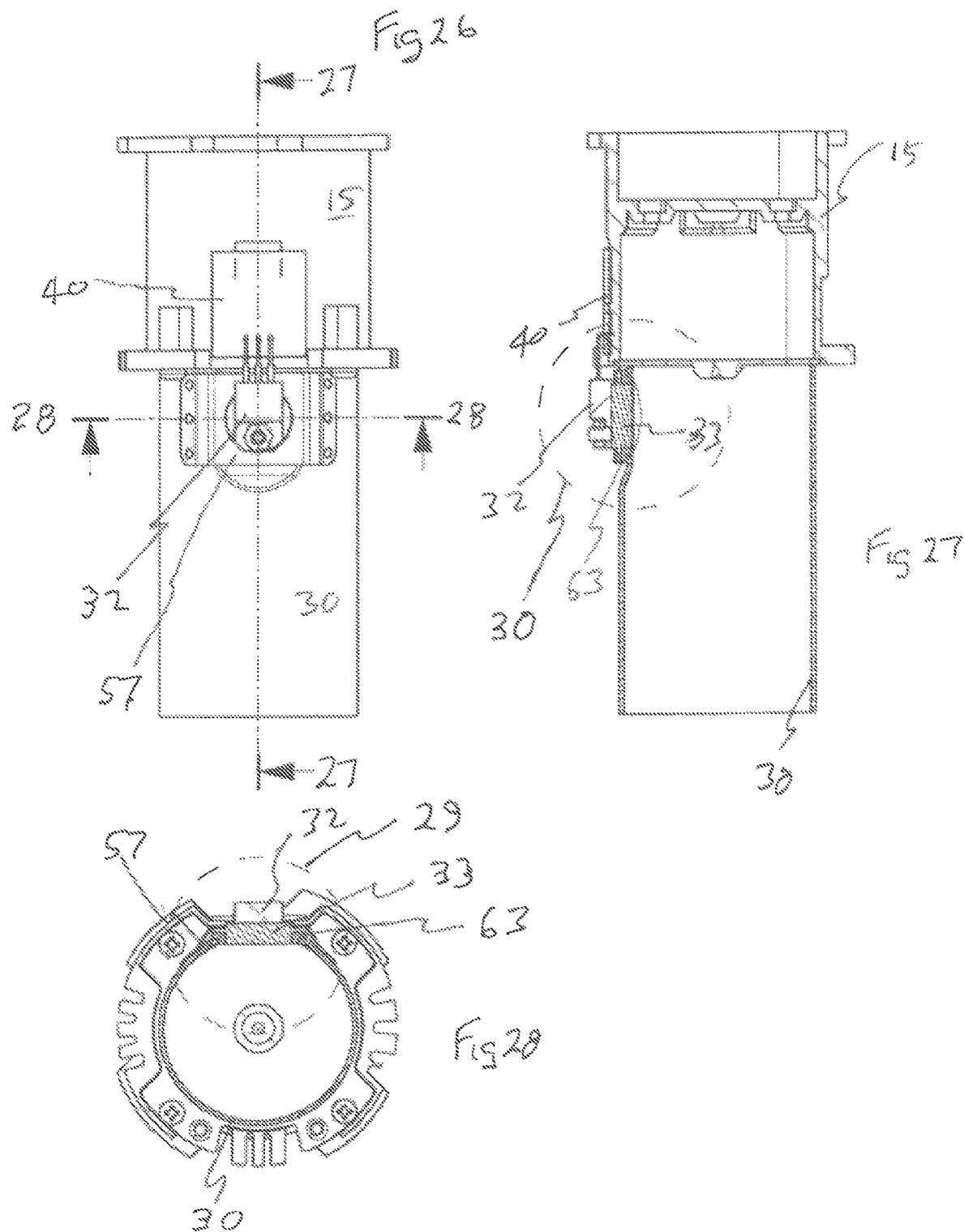

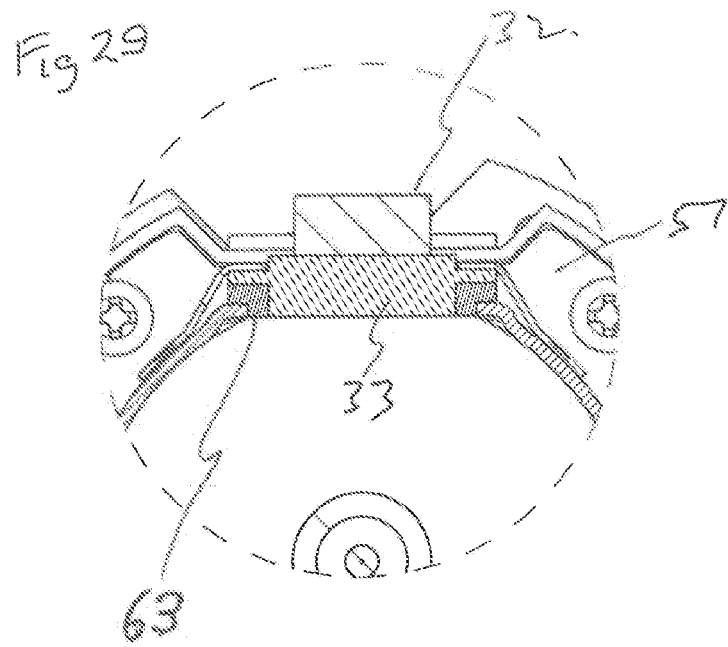
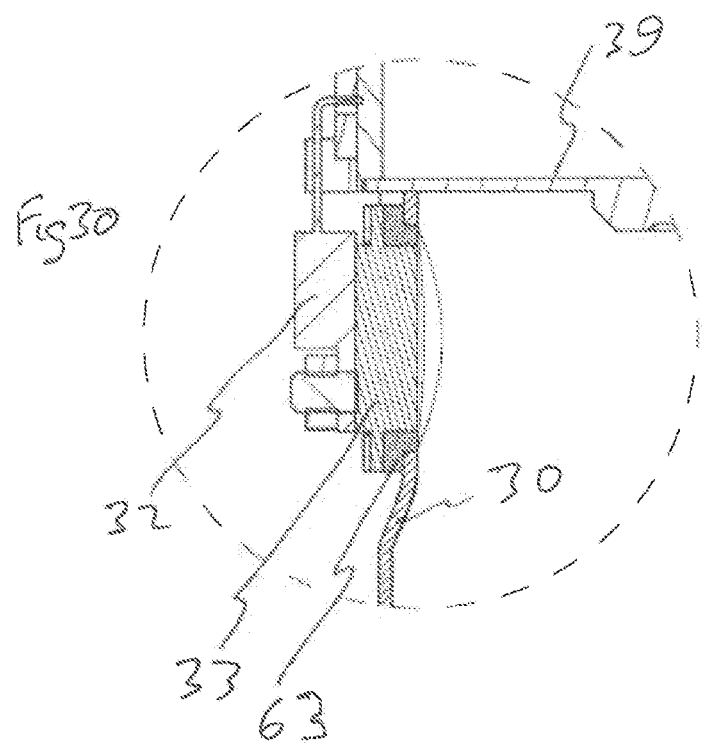

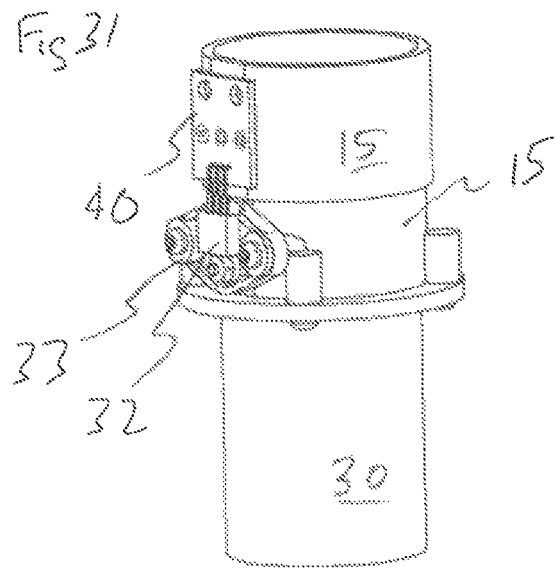
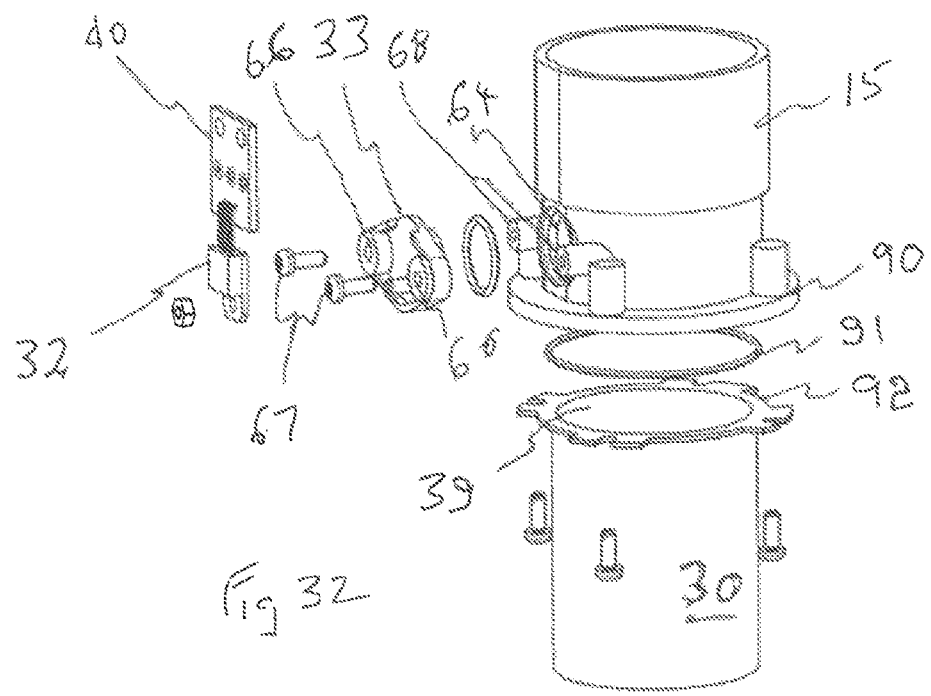

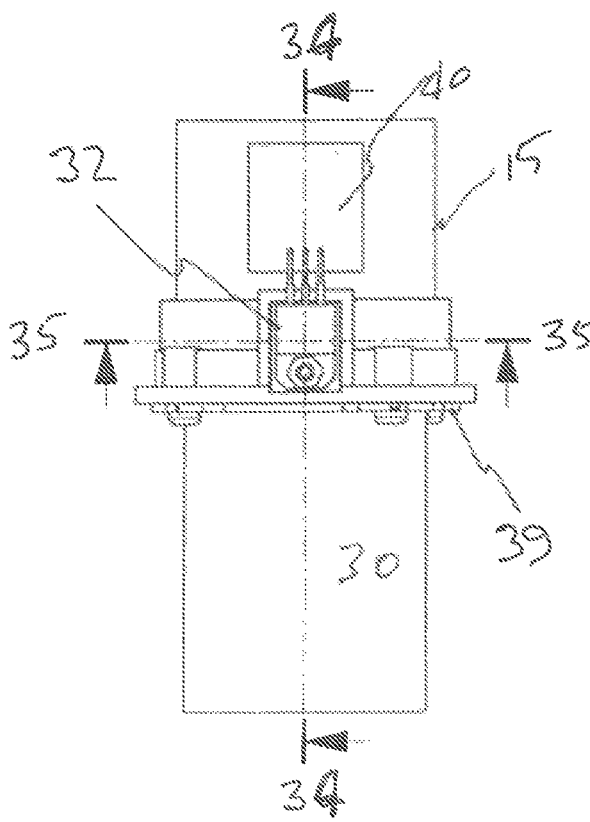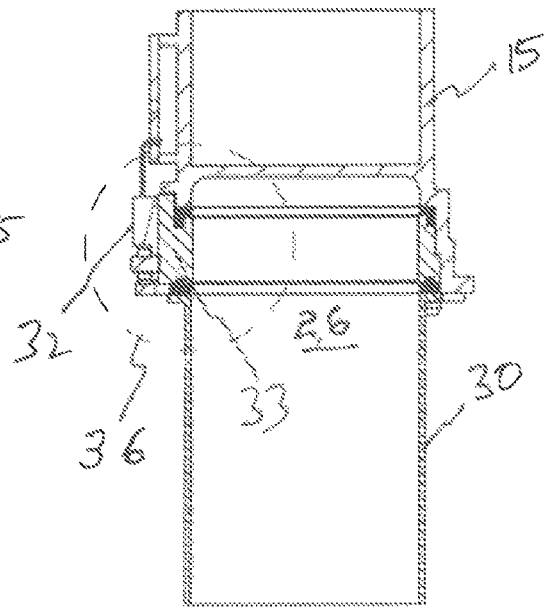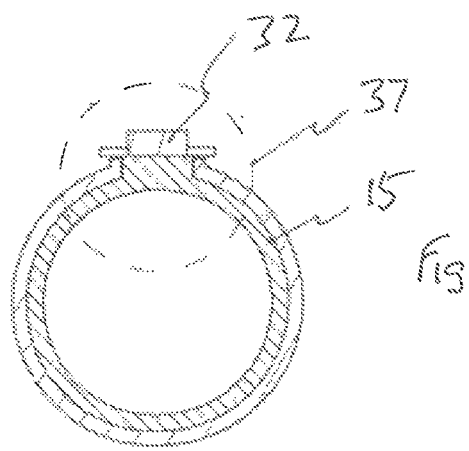

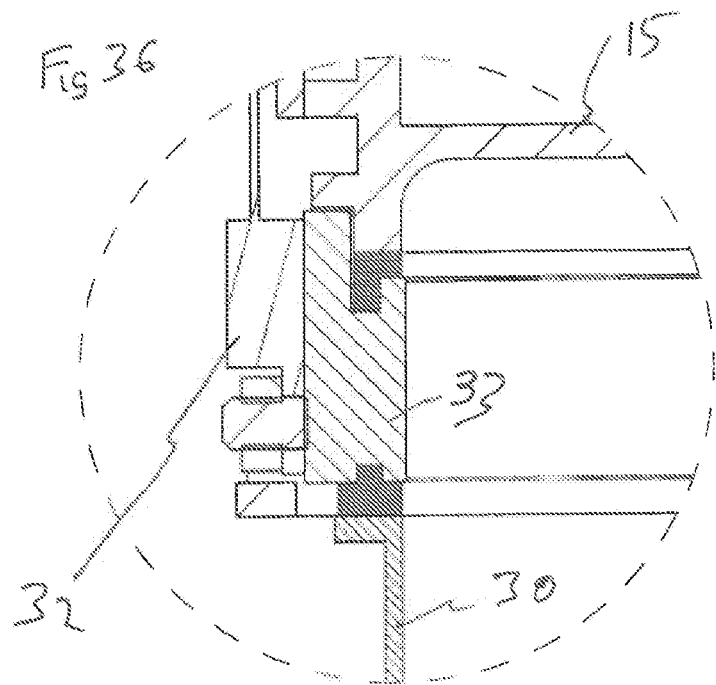
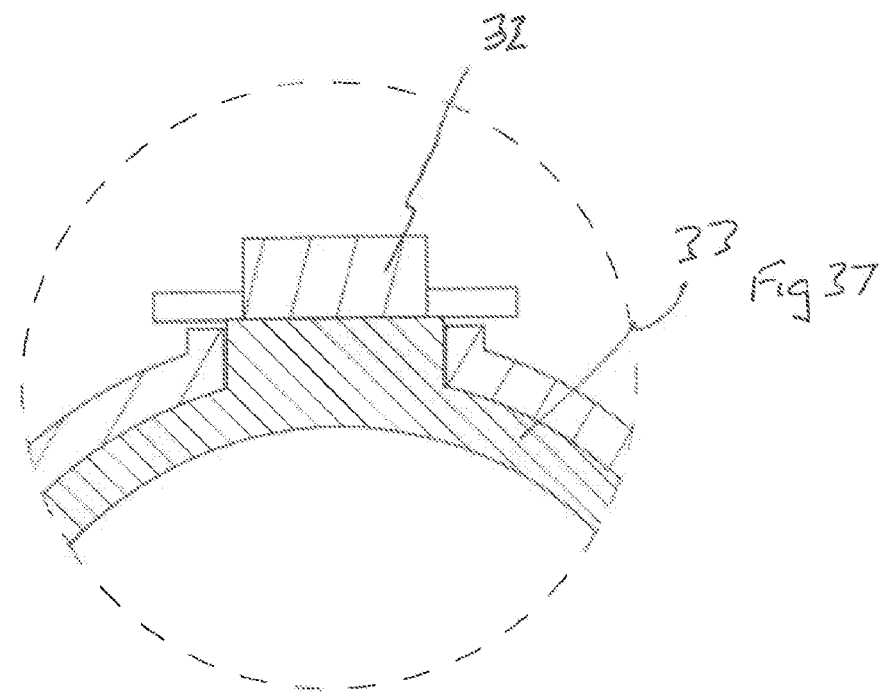

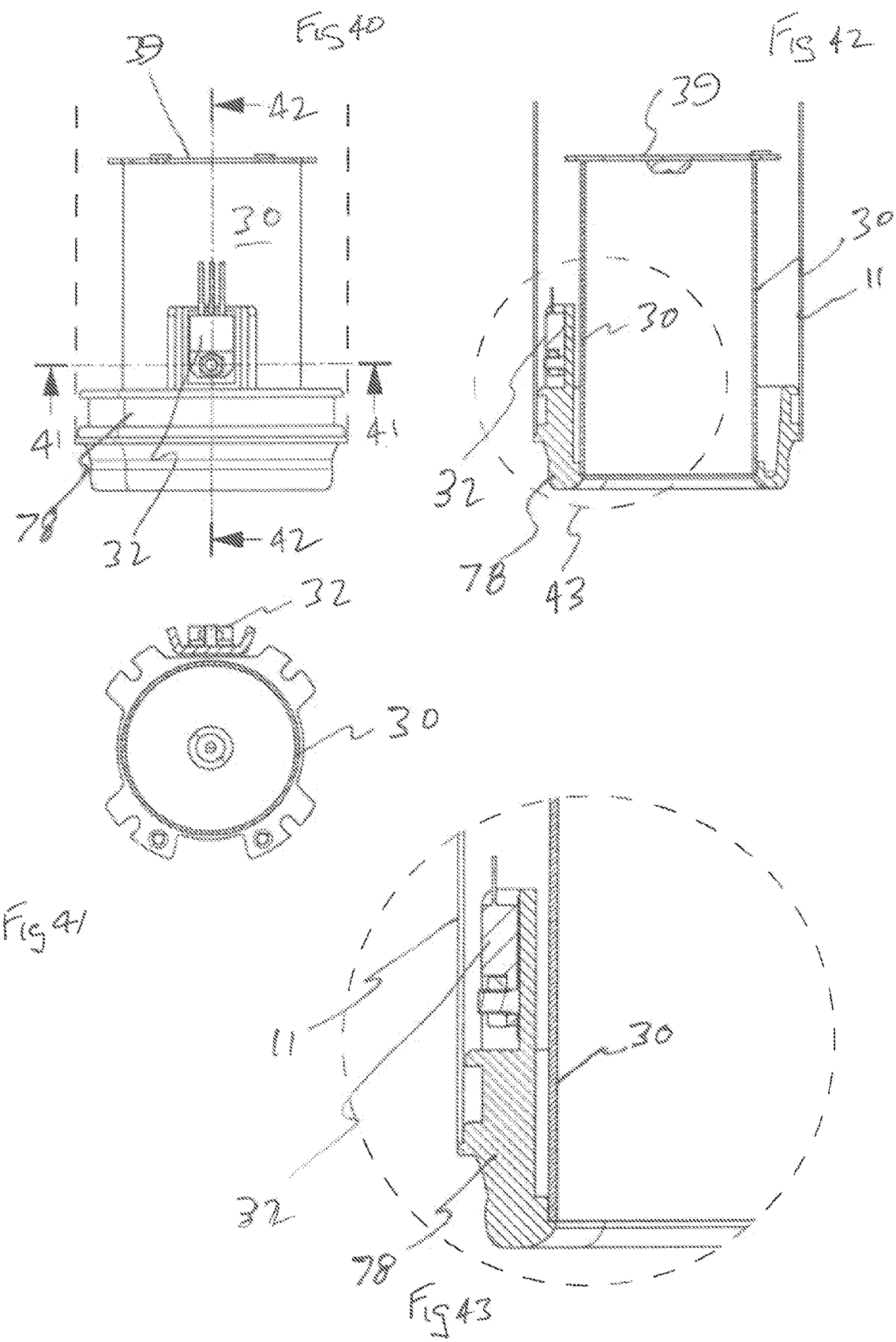

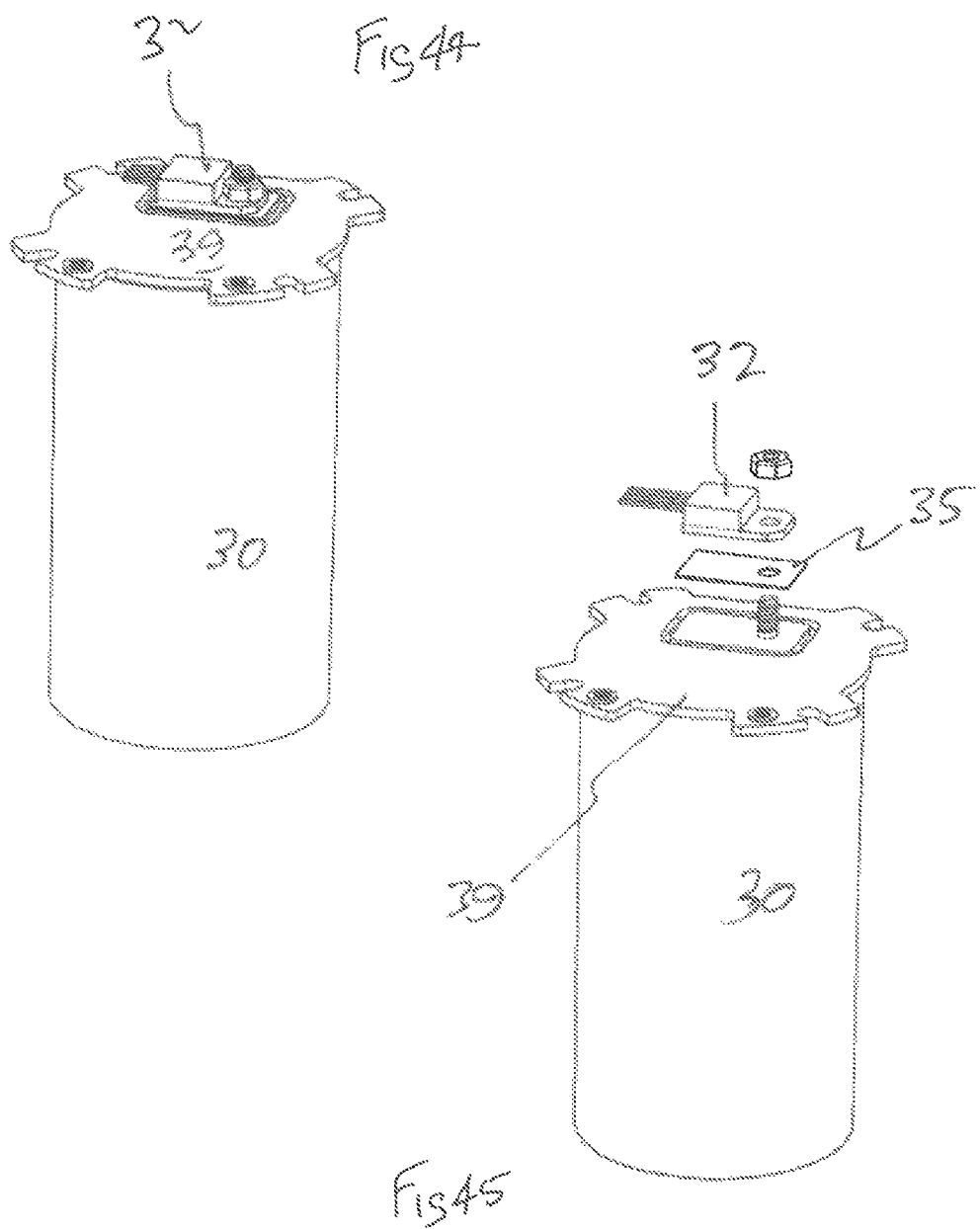

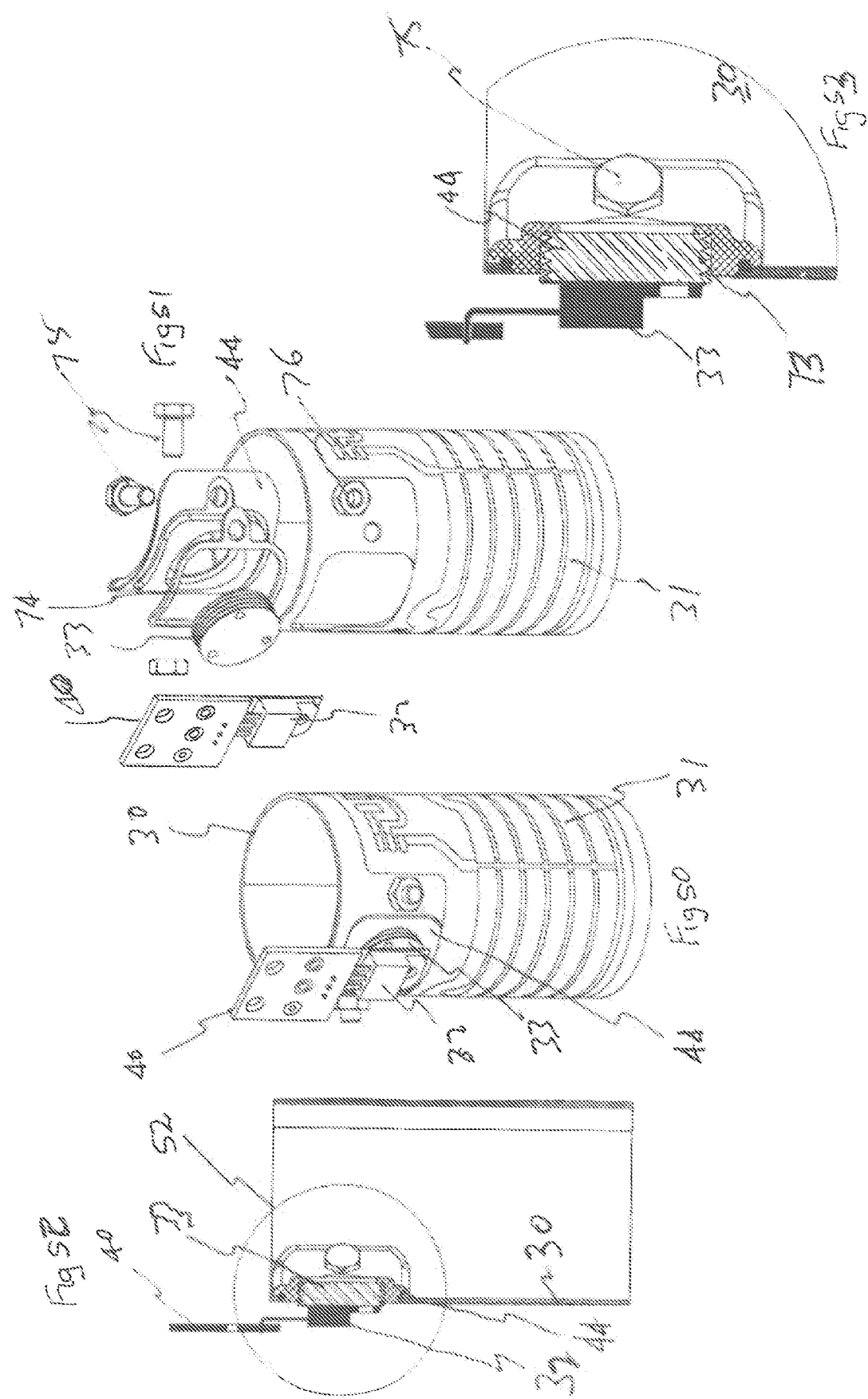

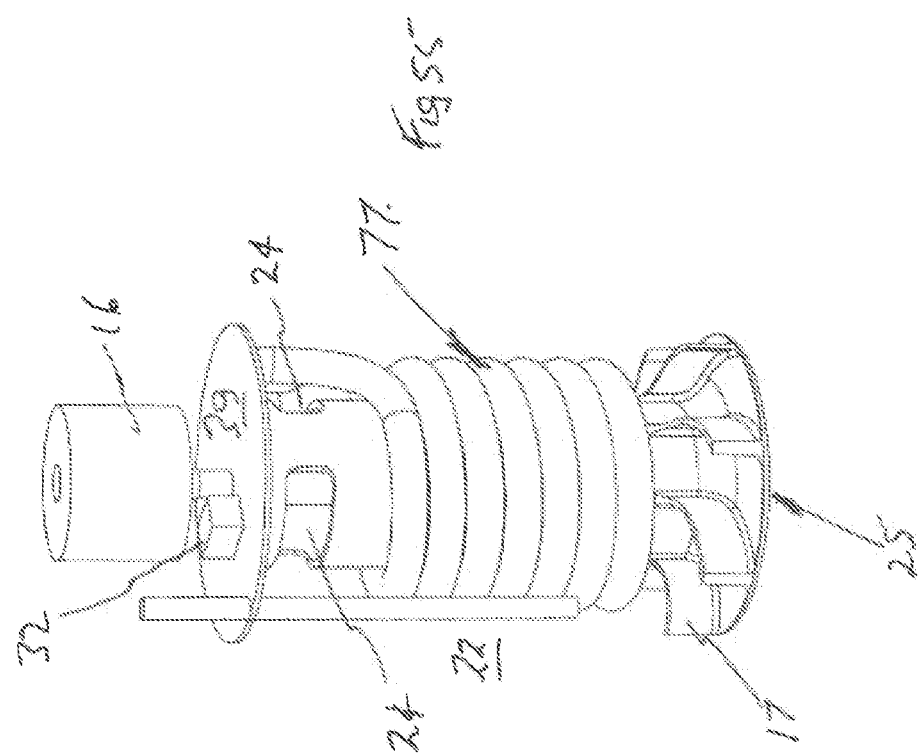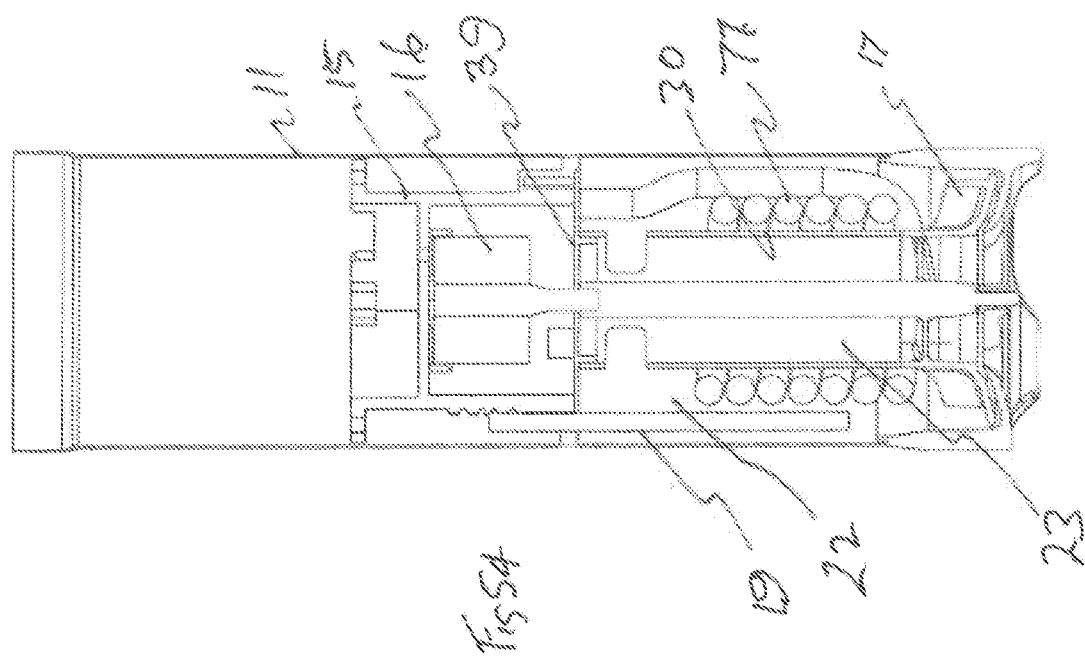

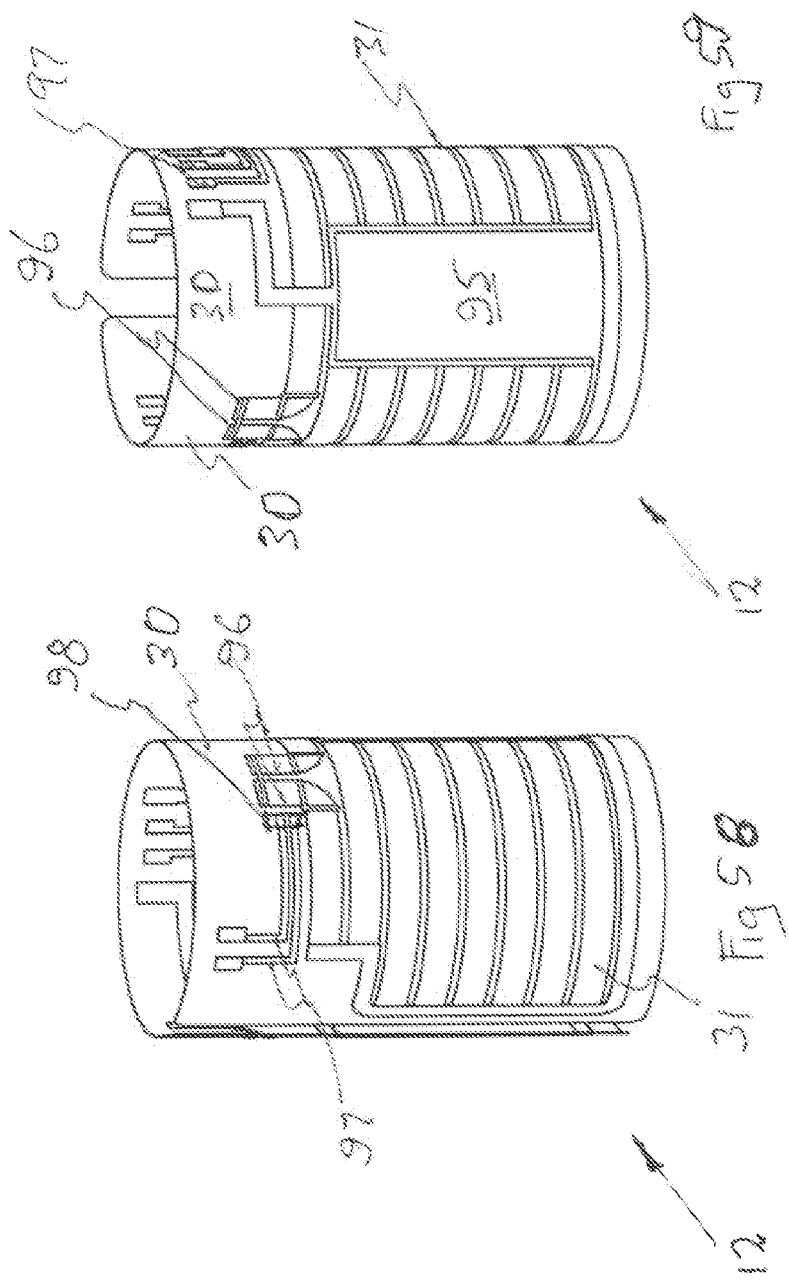

SOUS VIDE APPLIANCE

FIELD

The present invention relates to low temperature cooking appliances, and more particularly, but not exclusively to sous vide appliances.

BACKGROUND

Low temperature cooking appliances such as sous vide appliances, provide for circulation of liquid within which a food product is being cooked. The sous vide appliance heats the liquid in order to cook the food product.

Sous vide appliances are disclosed in U.S. Pat. No. 9,215,948 and International Patent Application WO 2017066692. Sous vide appliances, such as the appliances described in the above two patent publications, have an electric motor that drives an impeller to cause liquid to flow through the appliance, and a heating element to heat the liquid. The heating element is controlled by a switch, such as a triac switch, typically mounted on a printed circuit board. A problem associated with these switches is that they generate heat that needs to be dissipated in order to avoid damage to the switch.

An attempt to address the above issue is described in the abovementioned International Patent Publication WO 2017066692. In particular, the sous vide device of this patent publication has an outer main body with a tubular side wall upon which the switch is mounted so that the switch is physically and thermally coupled to the tubular side wall so that liquid flowing through the appliance cools the switch.

A further disadvantage of previous sous vide devices is that the triac switch is mounted relative to the heating element such that the switch can be heated thereby. Accordingly, the triac switch can become vulnerable to failure as a result of being overheated.

A still further disadvantage of previous sous vide devices is early failure of the bearings that support the impeller. In particular their life span was short, as any leakage through the seal causes advanced damage to the bearing. Steam and condensation cause failure of the bearings.

A disadvantage of the above sous vide appliance is that the heating element is also applied to the tubular side wall, with the heating element heating the tubular side wall and therefore inhibiting cooling of the switch.

OBJECT

It is the object of the present invention to overcome or substantially ameliorate the above disadvantage.

SUMMARY OF INVENTION

There is disclosed herein a sous vide appliance including:
a tube having longitudinally opposite first and second ends, and providing a liquid flow path having an inlet adjacent the first end, and an outlet adjacent the second end;
a heating element mounted adjacent the tube to heat liquid passing along the flow path from the inlet to the outlet;
an outer housing within which the tube is located; and
a switch located between the tube and the housing and operatively associated with the heating element to provide for the delivery of electric power to the heater element.

Preferably, the switch is located proximate to the second end so as to be cooled by conduction.

Preferably, the switch is mounted on the outer housing to at least assist in conductively cooling the switch.

Preferably, said tube is an outer tube, and the sous vide appliance includes an inner tube, the inner tube being located within the outer tube but spaced therefrom with the flow path being an outer flow path and located between the inner and outer tubes, the inner tube providing an inner flow path, that is joined to the outer flow path, the outer flow path having an outlet and an inlet, with the outer flow path outlet being adjacent the inner flow path inlet, and the outer flow path inlet being adjacent the inner flow path outlet.

Preferably, the inner tube is part of an assembly that causes liquid to flow from the inner flow path inlet, to the outer flow path outlet.

Preferably, the assembly that causes the liquid to flow is an impeller assembly.

Preferably, the appliance includes a heat sink, with the switch attached to the heat sink, and the heat sink attached to the housing, with the heat sink located between the switch and outer housing to aid in maintaining switch temperature within desired limits.

Preferably, a dielectric insulator is located between the switch and heat sink.

Preferably, the tube includes a cylindrical member to which the heating element is applied, with an insulating member being located adjacent the cylindrical member at a portion of the cylindrical member at which the heating element is not present.

Preferably, the outer housing includes a housing cylindrical member having a cylindrical inner surface, to which the heat sink is applied, with the heat sink having an arcuate surface to match the inner cylindrical surface of the housing.

Preferably the switch is located intermediate the first and second ends of the outer housing.

There is also disclosed herein a sous vide appliance including:
a tube having a longitudinal opposite first and second ends, and providing a fluid flow path having an inlet adjacent the first end, and an outlet adjacent the second end;
a heating element mounted adjacent the tube to heat liquid passing along the flow path from the inlet to the outlet;
an outer housing within which the tube is located;
a switch mounted on the tube and operatively associated with the heating element to provide for the delivery of electric power to the heating element; and
a thermal insulating member located between the switch and the tube to at least assist in thermally isolating the switch from the tube and therefore the heating element.

Preferably, the appliance includes a heat sink, with the switch mounted on the heat sink and the insulating member between the heat sink and inner tube, so that the heat sink is located between the switch and thermal insulating member.

In one preferred form, the tube is provided with an aperture within which the heat sink is mounted by the thermal insulating member.

In a further alternative construction, the appliance includes a motor mounting and a transverse wall, with the transverse wall being located between the motor mounting and the tube.

Preferably, the tube is an inner tube, and the sous vide device includes an outer tube, the inner tube being located within the outer tube, with the first flow path being an inner flow path, the inner tube is spaced from the outer tube so as to provide an outer flow path connected to the inner flow path, and wherein the outer flow path has an outer flow path inlet that receives liquid from the inner flow path outlet, and an outer flow path outlet adjacent the inner flow path inlet.

Preferably, the inner tube is part of an assembly that causes the liquid to flow from the inner path inlet to the outer path outlet.

Preferably, the assembly that causes the liquid to flow is an impeller assembly.

There is further disclosed herein a sous vide appliance including:

a tube having longitudinal opposite first and second ends, and providing a liquid flow path having an inlet adjacent the tube first end and an outlet adjacent the tube second end;

a heating element mounted adjacent the tube to heat liquid passing along the flow path from the inlet to the outlet;

an outer housing within which the tube is located;

a motor mounting;

a switch operable to deliver electric power to the heating element and located adjacent the motor mounting so as to be separated from the fluid flow path.

In one preferred form, the switch is attached to the motor mounting.

There is also disclosed herein a sous vide device including:

a tube having longitudinal opposite first and second ends, and providing for a fluid flow path having an inlet adjacent the tube first end and an outlet adjacent the tube second end;

a heating element located adjacent the fluid flow path to heat liquid passing therealong;

a wall adjacent which the fluid flow path is located;

an electric motor part mounted relative to the wall so as to be isolated from liquid passing along the fluid flow path; and a switch located adjacent the wall but located so as to be isolated from liquid passing along the fluid flow path, the switch being operable to deliver electric power to the heating element.

Preferably, the switch is mounted on the wall.

There is still further disclosed herein a sous vide appliance including:

a tube having longitudinally opposite first and second ends, and providing a fluid flow path having an inlet adjacent the first end, and an outlet adjacent the second end;

a heating element mounted adjacent the tube to heat liquid passing along the fluid flow path from the inlet to the outlet;

an outer housing within which the tube is located; and a switch mounted on the tube and operatively associated with the heating element to provide for the delivery of electric power to the heating element.

In the above described sous vide appliances, in one preferred form the tube is an outer tube, and the appliance further includes an inner tube having opposite first and second ends, and located within the outer tube but spaced therefrom so as to provide an outer duct between the inner tube and the outer tube, the inner tube first end being located adjacent the outer tube first end, and the inner tube second end being located adjacent tube second end, with the inner tube providing an inner duct that is in communication with the outer duct so as to provide said liquid flow path.

In a further preferred form, the appliance includes an impeller assembly to cause the liquid to pass along the fluid flow path.

In a further preferred form, the inner tube forms part of the impeller assembly.

There is also disclosed herein a sous vide appliance including:

an impeller assembly to cause liquid to pass along a flow path, the impeller assembly including, a tube having longitudinal opposite first and second ends, and providing the fluid flow path, the flow path having an inlet adjacent the first tube end and an outlet adjacent the second tube end, an impeller operatively associated with the flow path and attached to the tube so that upon rotation of the tube liquid is caused to pass along the flow path from the inlet to the outlet;

a magnetic drive to cause rotation of the tube, the drive including, drive magnets that are rotatably driven, driven magnets rotatably driven by the drive magnets, the driven magnets being fixed with respect to the tube so that the tube is driven thereby; and a rotation support assembly to provide for rotation of the tube, the support assembly including, a shaft;

a bearing assembly engaged with the shaft, with the bearing assembly providing for rotation of the tube; and wherein the bearing assembly includes a jewel bearing member abutting the shaft.

Preferably, the shaft is fixed and the bearing assembly attached to the tube.

Preferably, the jewel bearing member is a ruby bearing.

Preferably, the jewel bearing member is attached to the tube by a resilient member.

Preferably, the resilient member is an elastomer.

BRIEF DESCRIPTION OF DRAWINGS

Preferred forms of the present invention will now be described by way of example with reference to the accompanying drawings wherein:

FIG. 2 is a schematic isometric view of an outer tube of the appliance of FIG. 1;

FIG. 3 is a schematic parts exploded isometric view of the outer tube of FIG. 2;

FIG. 4 is a schematic bottom isometric view of the outer housing of the appliance of FIG. 1, with a switch mounted thereon;

FIG. 5 is a schematic plan view of portion of the appliance of FIG. 1;

FIG. 6 is a schematic sectioned side elevation of the appliance as shown in FIG. 5 sectioned along the line 6-6;

FIG. 7 is a schematic enlarged view of portion 7 of the appliance as shown in FIG. 6;

FIG. 8 is a schematic sectioned plan view of the appliance as sectioned along the line 8-8 of FIG. 6;

FIG. 9 is a schematic parts exploded isometric view of the switch and part of the outer housing of the appliance of FIG. 1;

FIG. 10 is a schematic parts exploded isometric view of a modification of the switch and outer housing of the appliance as shown in FIG. 9;

FIG. 11 is a schematic parts exploded isometric view of an alternative construction for portion of the sous vide appliance of FIG. 1;

FIG. 12 is a schematic side elevation of the sous vide appliance portion shown in FIG. 11;

FIG. 13 is a schematic sectioned plan view of the sous vide appliance portion of FIG. 12 sectioned along the line 13-13;

FIG. 14 is a schematic sectioned side elevation of the sous vide appliance portion of FIG. 12 sectioned along the line 14-14;

FIG. 15 is a schematic enlarged view of the portion 15 identified in FIG. 13;

FIG. 16 is a schematic enlarged view of the portion 16 identified in FIG. 14;

FIG. 17 is a schematic isometric view of a modification of a portion of the sous vide appliance of FIG. 1;

FIG. 18 is a schematic parts exploded isometric view of the sous vide appliance portion of FIG. 17;

FIG. 19 is a schematic side elevation of a further modified portion of the sous vide appliance of FIG. 1;

FIG. 20 is a schematic sectioned side elevation of the sous vide appliance portion of FIG. 19 sectioned along the line 20-20;

FIG. 21 is a schematic sectioned plan view of the sous vide appliance portion as shown in FIG. 19 sectioned along the line 21-21;

FIG. 26 is a schematic side elevation of the sous vide appliance portion of FIG. 24;

FIG. 27 is a schematic sectioned side elevation of the sous vide appliance portion as shown in FIG. 26 sectioned along the line 27-27;

FIG. 28 is a schematic plan view of the sous vide appliance portion as shown in FIG. 26 sectioned along the line 28-28;

FIG. 29 is a schematic enlarged view of the portion identified in FIG. 28;

FIG. 30 is a schematic enlarged view of the portion 30 identified in FIG. 27;

FIG. 31 is a schematic isometric view of an alternative construction to portion of the sous vide appliance of FIG. 1;

FIG. 32 is a schematic parts exploded isometric of the sous vide appliance portion of FIG. 31;

FIG. 33 is a schematic side elevation of the sous vide appliance portion of FIG. 31;

FIG. 34 is a schematic sectioned side elevation of the sous vide appliance portion as shown in FIG. 33 sectioned along the line 34-34;

FIG. 35 is a schematic plan view of the sous vide appliance portion as shown in FIG. 33 sectioned along the line 35-35;

FIG. 36 is a schematic enlarged view of the portion 36 identified in FIG. 34;

FIG. 37 is a schematic enlarged view of the portion 37 identified in FIG. 35;

FIG. 40 is a schematic side elevation of the sous vide appliance portion of FIG. 38;

FIG. 41 is a schematic plan view of the sous vide appliance portion as shown in FIG. 40 sectioned along the line 41-41;

FIG. 42 is a schematic sectioned side elevation of the sous vide appliance portion as shown in FIG. 40 sectioned along the line 42-42;

FIG. 43 is a schematic enlarged view of the portion 43 identified in FIG. 42;

FIG. 44 is a schematic isometric view of an alternative construction to portion of the sous vide appliance of FIG. 1;

FIG. 45 is a schematic parts exploded isometric view of the sous vide appliance portion of FIG. 44;

FIG. 50 is a schematic isometric view of an alternative construction of portion of the sous vide appliance of FIG. 1;

FIG. 51 is a schematic parts exploded isometric view of the sous vide appliance portion of FIG. 50;

FIG. 52 is schematic sectioned side elevation of the sous vide appliance portion of FIG. 50;

FIG. 53 is a schematic enlarged view of the portion of FIG. 52 identified in FIG. 51;

FIG. 54 is a schematic part sectioned side elevation of an alternative heater element used with the device of FIG. 1;

FIG. 55 is a schematic isometric view of the device as shown in FIG. 54;

FIG. 58 is a schematic isometric view of an alternate heating element employable in the appliance of FIG. 1; and FIG. 59 is a schematic isometric view of the heating element of FIG. 58.

DESCRIPTION OF THE PREFERRED EMBODIMENTS

Figure 1:
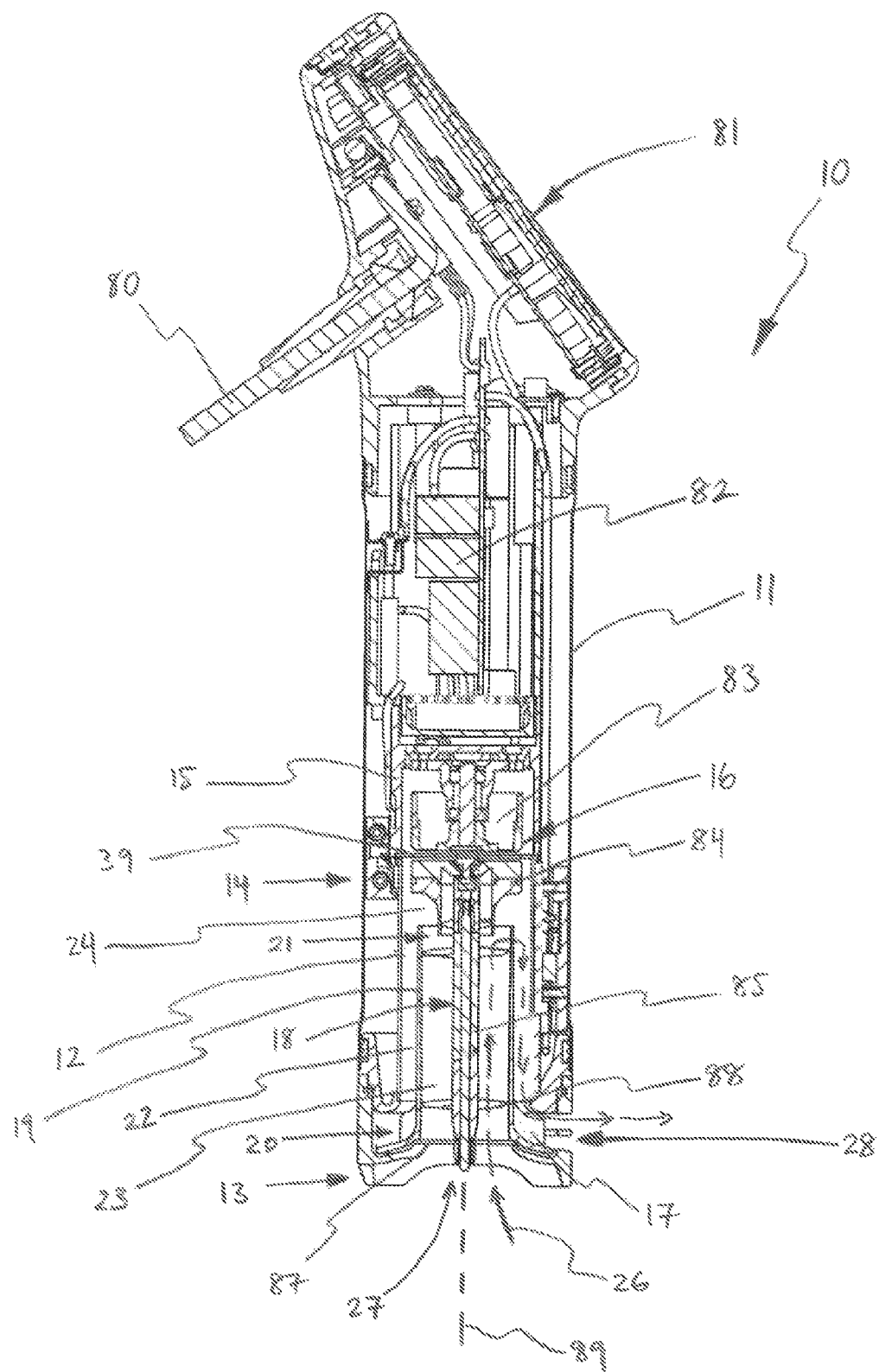
FIG. 1 is a schematic sectioned side elevation of a sous vide appliance.

In FIGS. 1 to 10 the accompanying drawings there is schematically depicted a sous vide appliance 10. The appliance 10 has an outer housing 11 within which there is a mounted an outer tube 12. The outer tube 12 has longitudinally opposite ends 13 and 14. Fixed to the end 14 is a motor mounting 15. Located in the outer housing is an electric motor 16.

The motor 16 receives electric power and is caused to rotate. The motor 16 includes a plurality of magnets 83 that rotate about the axis 89 to provide a rotating magnetic field. The motor 16 is fixed to the motor housing 15 and is located on one side of the transverse wall 39, so as not to be exposed to liquid passing through the appliance 10.

Supported on the fixed shaft 86 by a bearing assembly is an impeller assembly 18. The assembly 18 includes a tubular drive shaft 85 that is supported on the shaft 86. The impeller assembly 18 includes a plurality of magnets 84 that are caused to rotate about the axis 89 by the abovementioned rotating magnetic field. This in turn causes the impeller assembly 18 to rotate about the axis 89.

The impeller assembly 18 includes an inner tube 19 that is fixed to the shaft 85 so that the tube 19 rotates with the shaft 85. Fixed to the end extremity of the inner tube 19, adjacent the end 13, are impeller blades 17 provided by a bracket 87. The impeller assembly 18 also includes blades 88 fixed to the shaft 85 and secure the tube 19 to the shaft 85.

Located internally of the outer tube 12 is the inner tube 19 that has opposite first and second ends 20 and 21. The first end 13 is adjacent the first end 20, while the second end 14 is adjacent the second end 21.

The inner tube 19 is located internally of the outer tube 12 so that there is a gap therebetween providing an outer duct 22. The inner tube 19 provides an inner duct 23, with the duct 22 being connected to the duct 23 adjacent the ends 13 and 20 by means of a passage 24. The tube 18 acts as an impeller partition wall for the blades 88.

The outer duct 22, inner duct 23 and passages 24 provide a liquid flow path 26 extending from an inlet 27 of the sous vide appliance 10, provided by the inner duct 23 at the end 13 thereof, to an outlet 28 of the sous vide appliance 10 at the end 13 provided by the outer duct 22. It will be understood that the inlet 27 and the outlet 28 of the sous vide appliance 10 are both located adjacent the ends 13 and 20, i.e. at the same longitudinal end. The beginning and the end of the liquid flow path 26 are therefore adjacent the ends 13 and 20, i.e. at the same longitudinal end. It will be appreciated that providing the beginning and the end of the liquid flow path 26 at the same longitudinal end allows for more consistent or even water temperature to enter and exit the sous vide appliance 10. This arrangement may also allow for the placement of the sous vide appliance 10 in a relatively low level water bath.

In operation of the above described impeller assembly 18, rotation of the impeller assembly 18 causes liquid to pass along the path 26, from the inlet 27, at the end 20 of the inner tube 19, to the outlet 28, at the end 13 of the outer tube 12. Initially the impeller blades 88 push liquid toward the end 21, wherefrom the liquid flows from the end 14 to the blades 17 that push liquid out the outlet 28. In other embodiments (not shown), it will be appreciated that the impeller assembly 18 may be operated to reverse the direction of the liquid flow path 26, such that liquid passes from the outlet 28 (which is an inlet in this embodiment) to the inlet 27 (which is an outlet in this embodiment).

The flow path 26 is separated from the interior of the motor housing 15 by the wall 39.

The outer tube 12 includes a tubular member 30 that is of a cylindrical configuration, and has secured to it a heating element 31. The heating element 31 is secured to the outer surface of the member 30, with electric power being delivered to the element 31 to heat the tubular member 30 and therefore liquid passing thereby.

The appliance 10 has a user interface 81, with electric power delivered to the appliance 10 via power cord 80, connected to a controller 82. The controller 82 would be connected to the interface 81.

Power delivered to the heating element 31 is controlled by means of a switch 32. Preferably the switch 32 is a triac switch, and is connected to the controller 82.

The switch 32 is secured to a heat sink 33, by a threaded fastener 34. Preferably a dielectric insulator 35 is located between the switch 32 and the heat sink 33.

The switch 32 is located between the ends 13 and 14. In a preferred form, the switch 32 is located proximate to the end 13. It will thus be appreciated that, upon placement of the sous vide appliance 10 in a liquid bath, the switch 32 may be conductively cooled by the cooler liquid located towards the bottom of the liquid bath (i.e. proximate the end 13). It will be understood that the base of a vessel containing liquids is typically where the coolest liquid is located, thereby providing an effective heat sink to draw heat away from the switch 32.

In the above embodiments, the switch 32 is water cooled by conduction cooling, and is located in the sealed region between the outer housing 11 and the tube 12, so as to be thermally isolated from the heating element 31.

In this embodiment the housing 11 has an arcuate internal surface 36, with the heat sink 33 having an arcuate surface 37, that abuts the surface 36 to provide for efficient transfer of heat from the heat sink 33 to the housing 11.

Secured to the surface 36 are the nuts 38 that are engaged by the threaded fasteners 93 to secure the heat sink 33 to the housing 11. The threaded fasteners 93 pass through apertures in the heat sink 33 and engage nuts 38 to fix the heat sink 33 to the housing 11.

The switch 32 is fixed to a printed circuit board 40, with the wires 41 and wire 42 connecting the switch 32 with the heating element 31 and a control mechanism not illustrated.

Located between the tubular member 30 and the switch 32 is a thermal insulating member 43 that effectively thermally isolates the switch 32 from the tubular member 30.

As best seen in FIG. 3, the heating element 31 is not located in an area 44 at which member 43 is located, again to at least assist in keeping the temperature of the switch 32 within desired limits.

As best seen in FIGS. 8 and 9, the member 43 is arcuate to match the arcuate configuration of the outer surface 45 of the member 30.

The heat sink 33 aids in maintaining the temperature of the switch 32 within desired limits, while also aiding in drawing heat from the switch 32, and conductively delivering heat to the housing 11 for dissipation therefrom.

With particular reference to FIG. 10, the dielectric insulator 35 is mounted in a recess 46 of the heat sink 33, with the housing 11 being provided with a pair of threaded projections 47 that pass through the heat sink 33 to engage nuts 48. The shafts 47 also pass through the switch 32 and secure the wire 42 to the switch 32.

Preferably, the heat sink 33 in the above described preferred embodiments is aluminium, preferably extruded or cast aluminium for optimal conductivity.

In FIGS. 11 to 16 there is schematically depicted an alternative construction of the mounting of the switch 32 of the sous vide appliance of FIG. 1.

In this construction, the tubular member 30 is provided with an aperture 49 adjacent which the switch 32 is mounted on the tubular member 30 via the heat sink 35.

Mounting bracket parts 50 and 51 secure the switch 32 together with a heat sink 35 to the tubular member 30. Fasteners 53 pass between the parts 50 and 51 to clamp the parts 50 and 51 about the tubular member 30.

A seal 54 sealingly connects the heat sink 35 with the tubular member 30, while a spacer 55 aids in mounting the heat sink 35 on the tubular member 30.

The part 50 has an aperture 53 through which the switch 32 projects together with the wires 41 and 42. A fastener 54 secures the switch 32 to the heat sink 35.

In the above alternative construction the heat sink 35, and therefore the switch 32 are firmly insulated from the tubular member 30 by the spacer 55 and seal 54. However, as the heat sink 52 is exposed to liquid passing along the outer duct 22, the heat sink 52 is cooled thereby.

In FIGS. 16A to 16D there is schematically depicted a further alternative construction of the mounting of the switch 32 and the heat sink 33 of the sous vide appliance of FIG. 1.

Figure 16A:
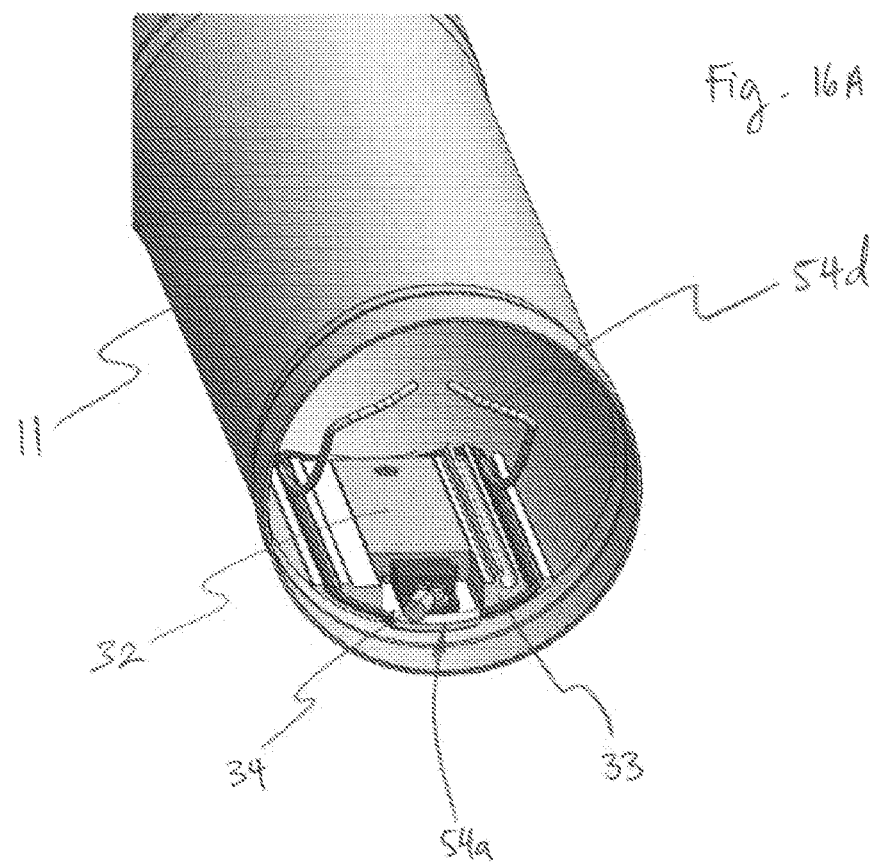
FIGS. 16A and 16B are schematic isometric views of a modification of a portion of the sous vide appliance of FIG. 1.
Figure 16B:
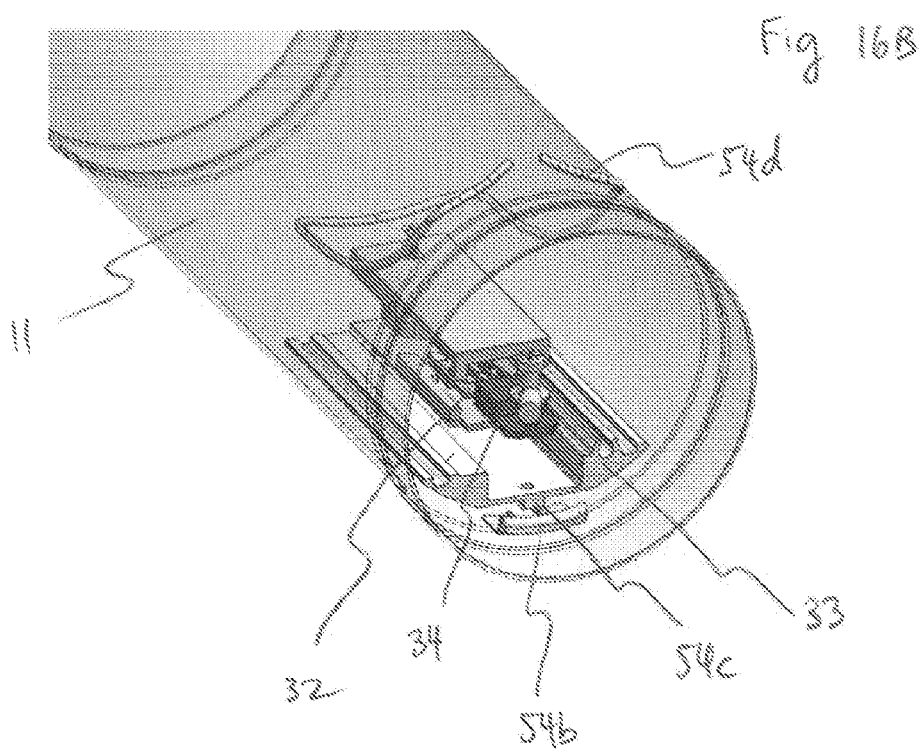
Figures 16C, 16D:
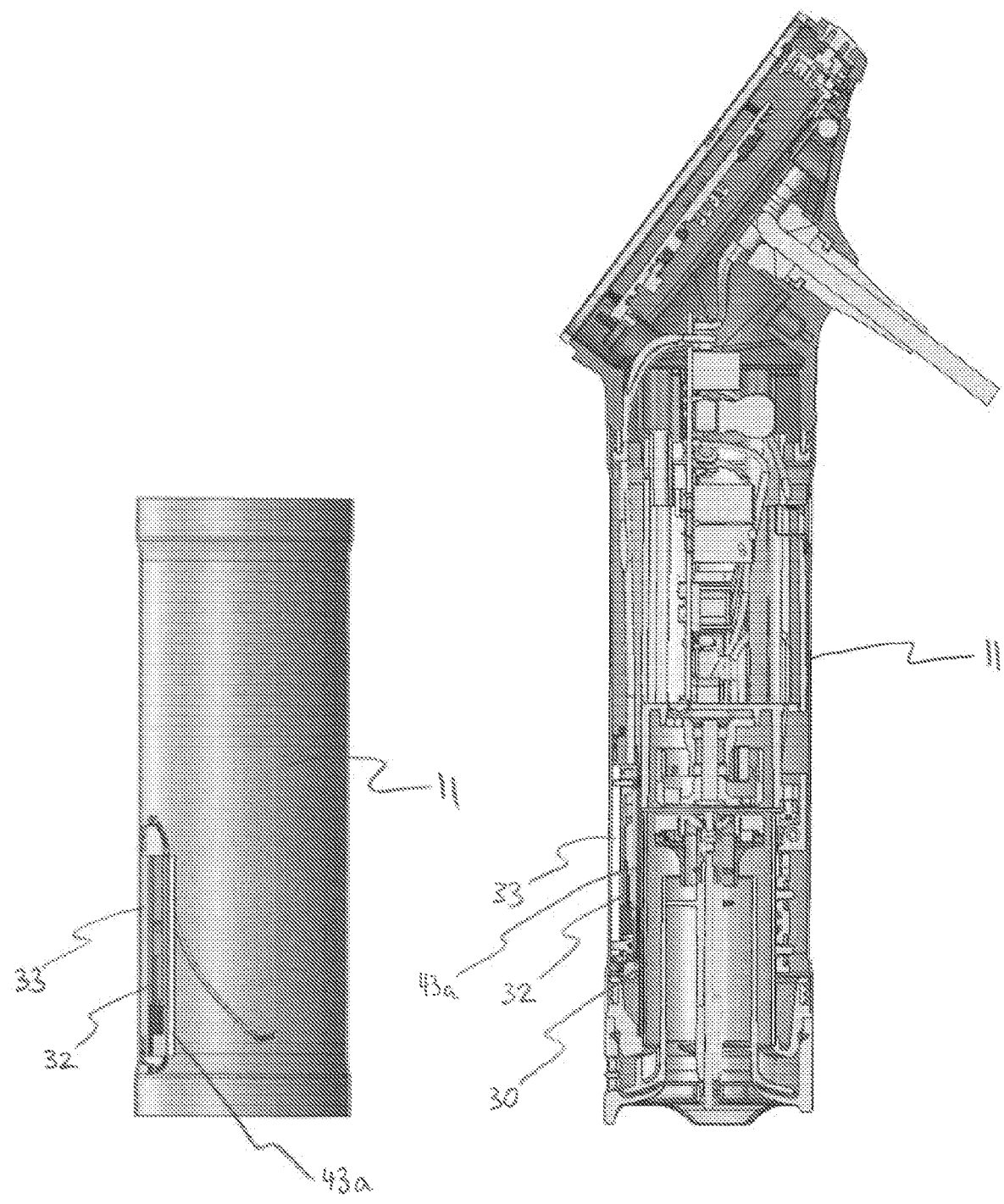
FIG. 16C is a schematic side elevation view of the sous vide appliance portion shown in FIGS. 16A and 16B.
FIGS. 16D and 16E are schematic sectioned side elevation views of a modification of the sous vide appliance portion shown in FIG. 1.
Figures 16E, 16F:
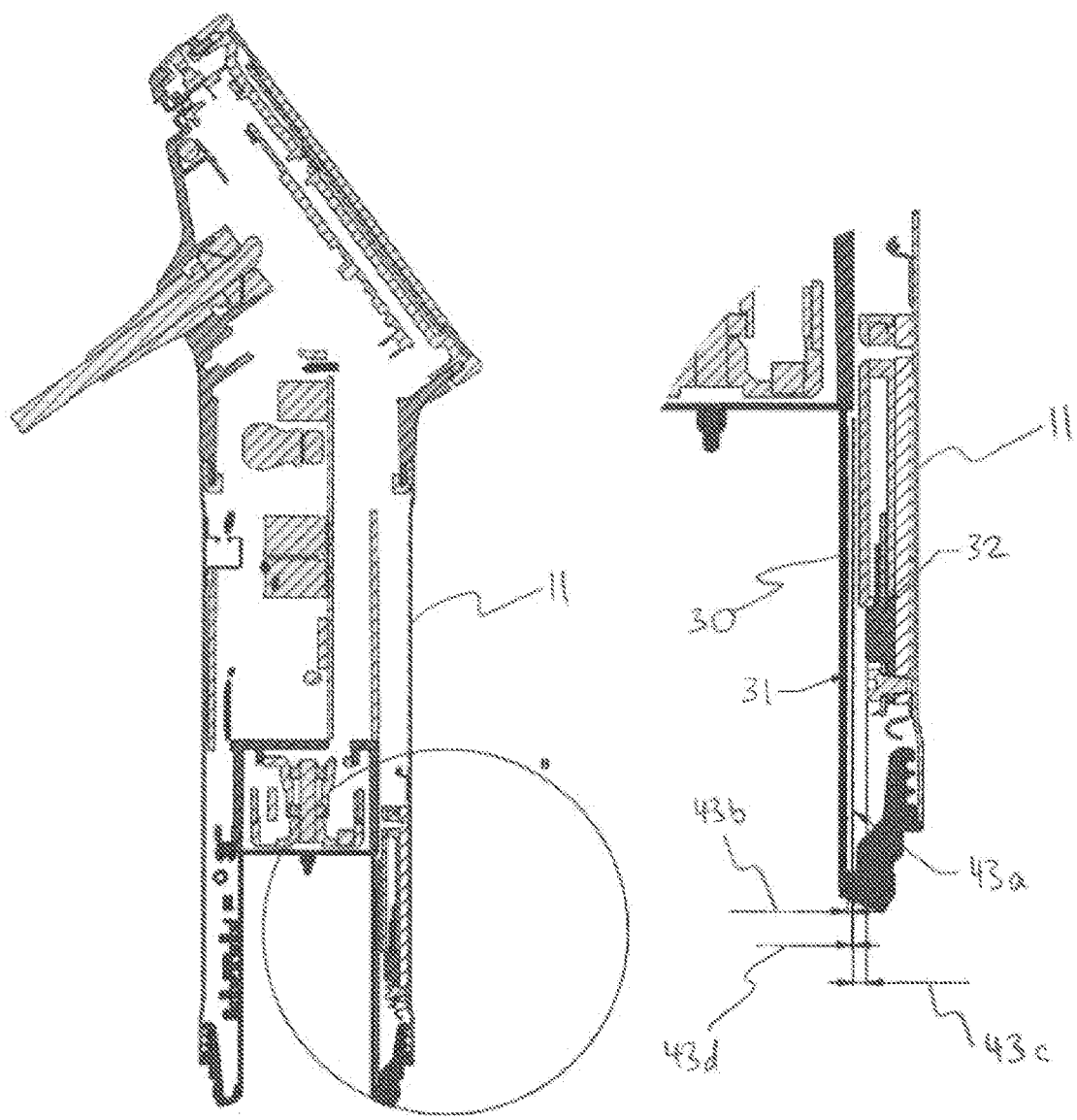
FIG. 16F is an enlarged view of region B of the sous vide appliance portion shown in FIGS. 16D and 16E.

In this construction, the heat sink 33 is secured to the housing 11 by way of a fastener 54a. In a preferred form, the fastener 54a is a latch mechanism. As best seen in FIG. 16B, the fastener 54a includes a receiving portion 54b located on an inner face of the housing 11 at a first end and a second end of the heat sink 33, respectively. The heat sink 33 includes a protruding portion 54c. In a preferred form, the protruding portion 54c protrudes from the center of the heat sink 33. The protruding portion 54c is aligned with the receiving portion 54b, and is inserted and mounted in the receiving portion 54b. A bent open loop wire element 54d, which is resiliently deformable, is inserted under the receiving portion 54b at the first end of the heat sink 33 and aligned with open, inward facing slots at the sides of the heatsink 33. The open ends of the wire element 54d are then manipulated to be captured under the receiving portion 54b at the second end of the heat sink 33. In this way, the deformation of the wire element 54d imparts a consistent force along either side of the heatsink 33 to ensure that it is forcibly contacting the inner face of the housing 11. This may at least provide enhanced contact between the heatsink 33 and the housing 11 to encourage thermal conductivity. The switch 32 is secured to the heat sink 33 by the threaded fastener 34 as described above.

As best seen in FIGS. 16C to 16G, an additional thermal insulating member 43a is provided between the switch 32 and the tubular member 30. The thermal insulating member 43a is spaced from the tubular member 30 (and thereby the heating element 31) by a distance 43b. The thermal insulating member 43a is also spaced from the switch 32 by a distance 43c. In a preferred form, the distance 43b and 43c are each about 1 mm, and preferably about 0.9 mm. It will be appreciated that the spaces between the heating element 31, the thermal insulating member 43a, and the thermal insulating member 43a and the switch 32 are air gaps that may at least assist in providing thermal insulation to the switch 32. In a preferred form, the thermal insulating member 43a is formed from a sheet of mica. The sheet of mica preferably has a thickness 43d of about 0.2 mm.

Figure 16G:
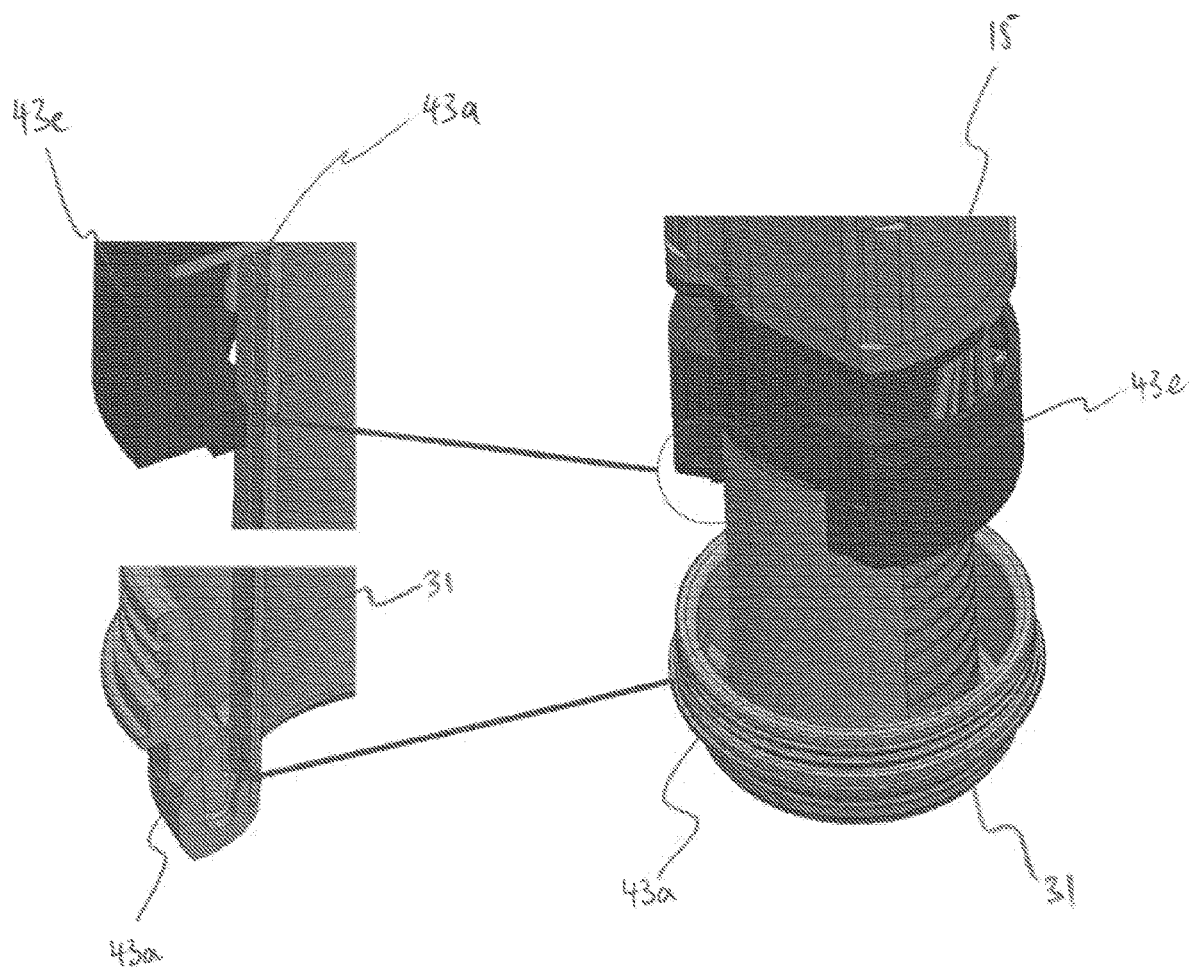
FIG. 16G are schematic isometric views of the sous vide appliance portion shown in FIGS. 16D and 16C.
Figure 22:
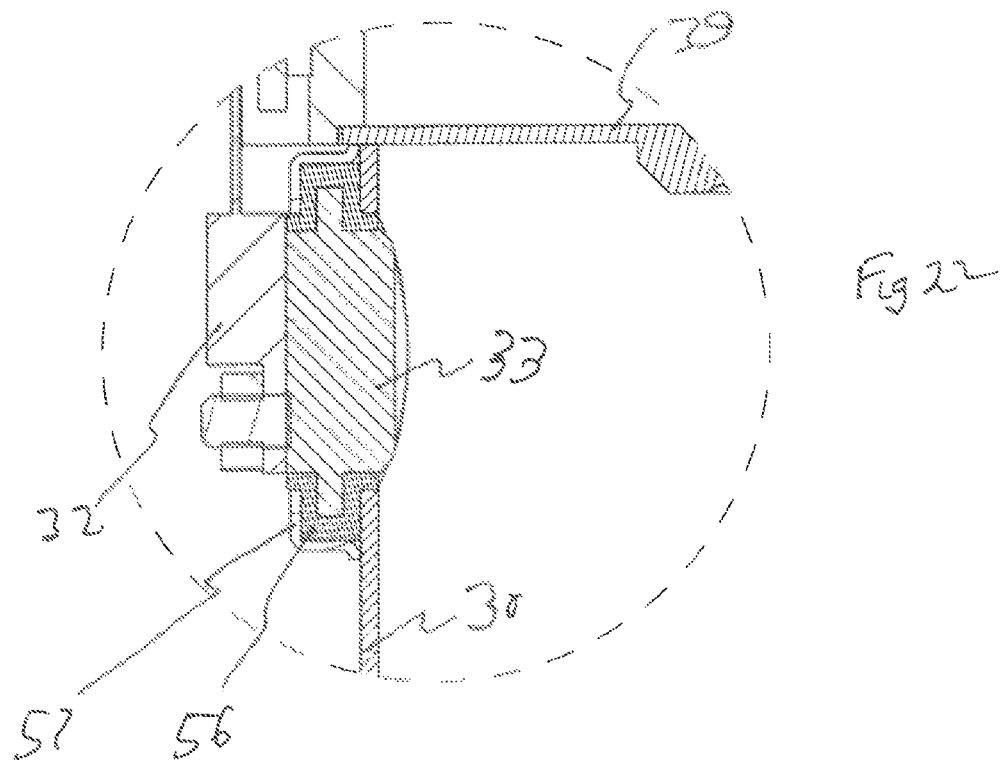
FIG. 22 is a schematic enlarged view of the portion 22 identified in FIG. 20.
Figure 23:
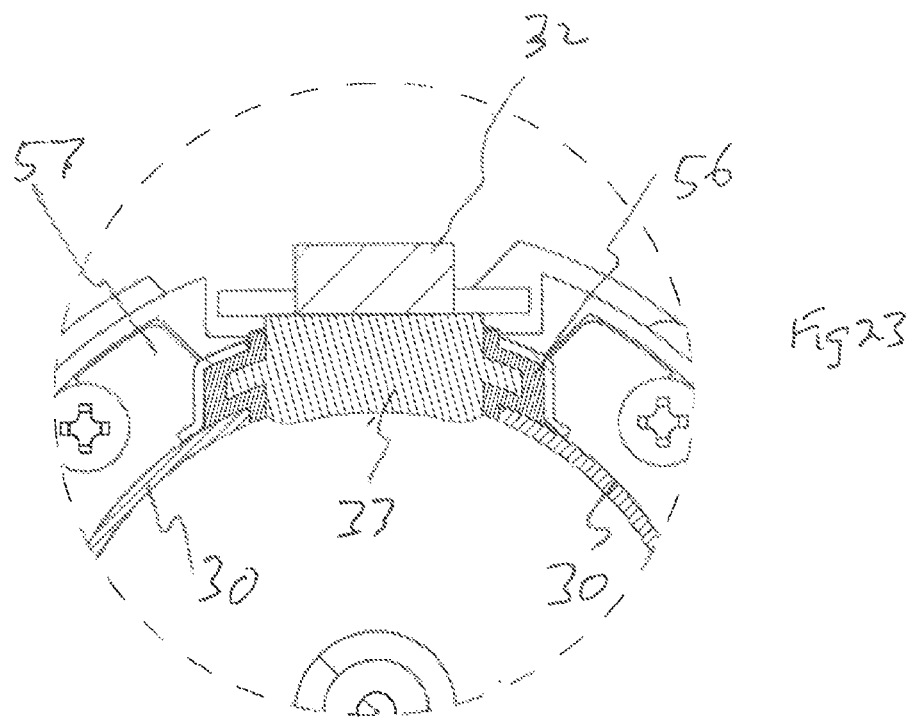
FIG. 23 is a schematic enlarged view of the portion 23 identified in FIG. 21.
Figure 24:
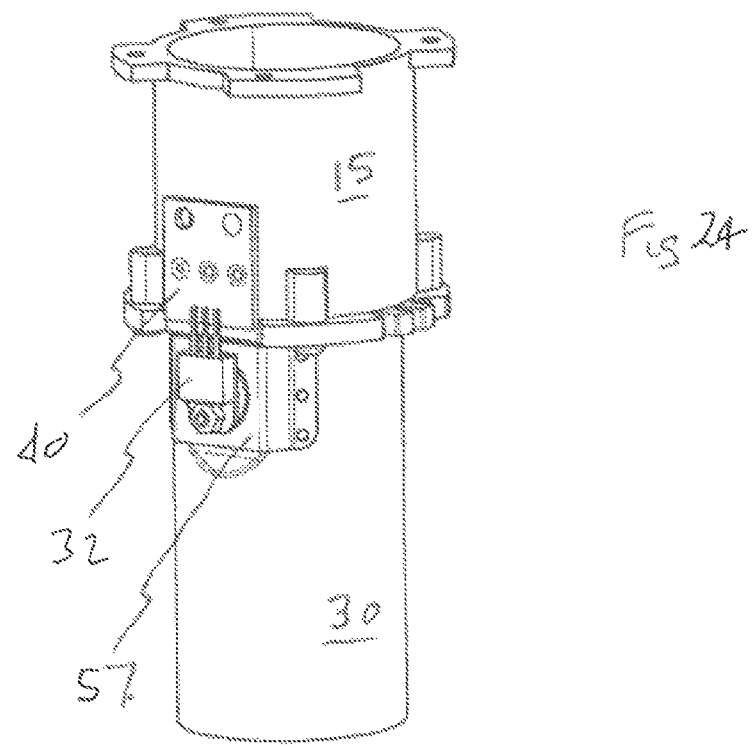
FIG. 24 is a schematic isometric view of an alternative construction for portion of the sous vide appliance of FIG. 1.
Figure 25:
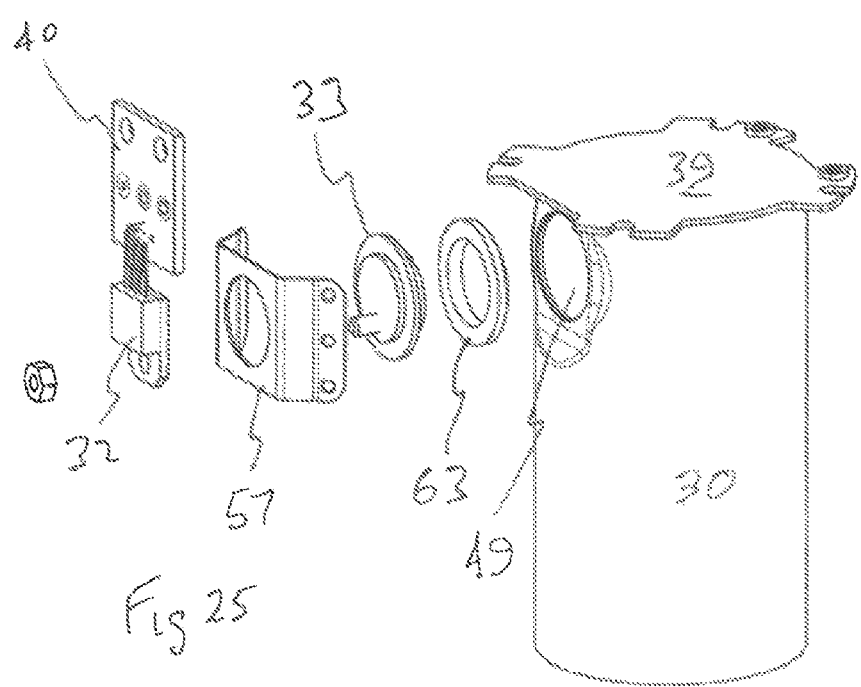
FIG. 25 is a schematic parts exploded isometric view of the sous vide appliance portion of FIG. 24.

As best shown in FIG. 16G, the thermal insulating member 43a differs from the thermal insulating member 43 described above by its larger size. This may at least increase thermal insulation from the heating element 31. In the embodiment shown, the thermal insulating member 43a is retained in place underneath a collar 43e, which is located adjacent to the motor housing 15.

In the construction of FIGS. 17 to 23, the seal 54 and spacer 55 are replaced with an insulation member/seal 56 that is shaped to be received in the aperture 49 to mount the heat sink 33 therein however, in transverse cross-section the seal 56 is "U" shaped so that the periphery of the heat sink 33 is contained therein. A plate 57 mounts the heat sink 33 and seal 56 of the tube 30, with the plate 57 having an aperture 58, that together with an aperture 62 in the seal 56 provide for securing of the switch 32 to the heat sink 33. In that regard the heat sink 52 has a threaded projection 60 that is engaged by a nut 61 to secure the switch 32 to the heat sink 33.

In the above construction, liquid passing along the outer duct 22 aids in cooling the heat sink 35, and therefore the switch 32.

In the construction of FIGS. 24 to 30, the seal 56 is replaced with an alternative insulator member/seal 63 that in transverse cross-section is of an "L" configuration. The plate 57 is also of an alternative construction.

In the embodiment of FIGS. 31 and 32, the switch 32 is mounted on the motor housing 15, that is not mounted on the tubular member 30. The motor housing 15 includes a flange 90 that is secured to an end portion of the tubular member 30, to close the end portion of the tubular member 30. A seal 91 sealingly connects the flange 90 to the flange 92 of the tubular member 30.

More particularly the construction includes an aperture 64 within which their projects a heat sink 33. The heat sink 33 includes a pair of passages 66 through which threaded fasteners 67 threadably engage portions 68 of the housing 15, so as to be secured thereto.

The switch 32 is again mounted on the heat sink 33.

The printed circuit board 40 is mounted on the housing 15.

In the embodiment of FIGS. 33 to 37, again the switch 32 is mounted on the motor housing 15, with the printed circuit board also mounted on the housing 15.

As is best seen in FIG. 34, the motor housing 15 closes the end of the tubular member 30 however, the heat sink 33 is located between the housing 15 and tubular member 30. By closing the end of the tubular member 30, the housing 15 separates the motor 16 from the liquid flow path 26.

Figure 38:
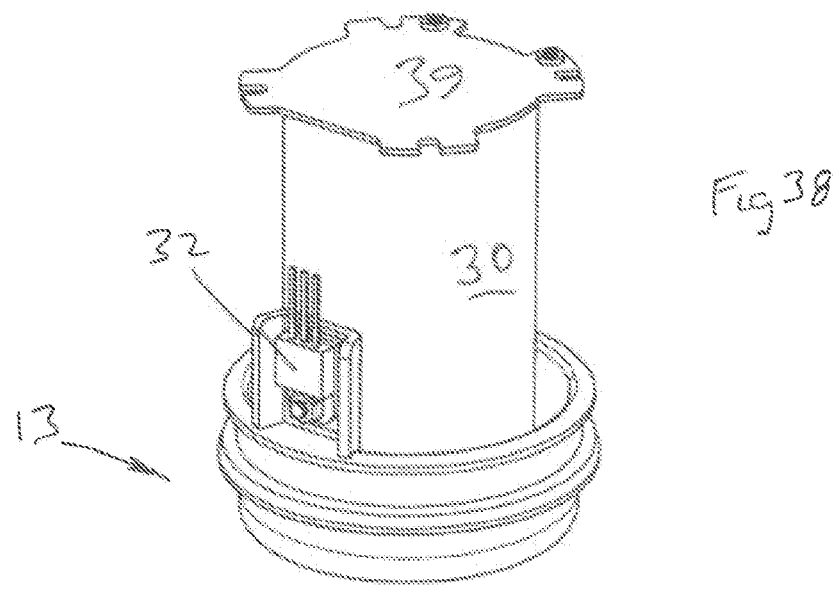
FIG. 38 is a schematic isometric view of an alternative construction for portion of the sous vide appliance of FIG. 1.
Figure 39:
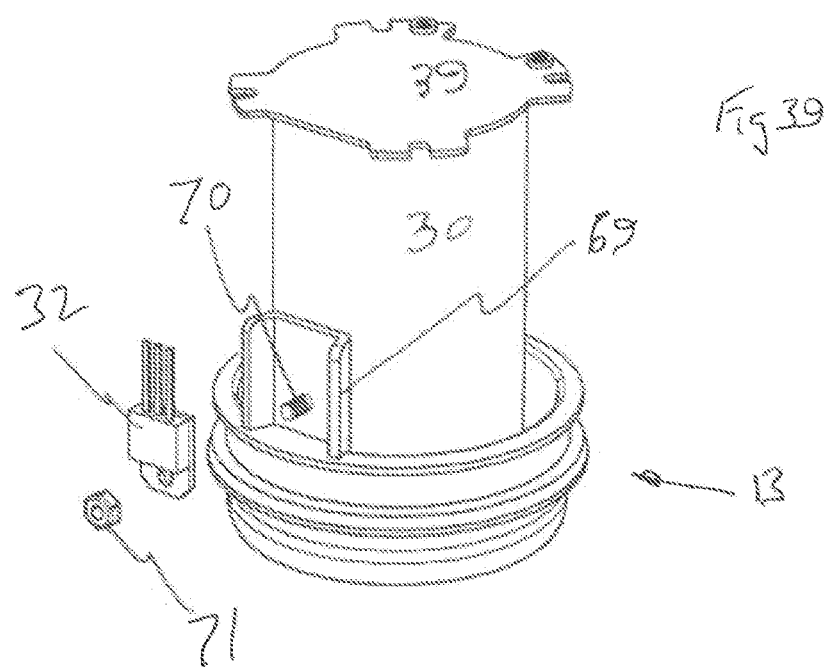
FIG. 39 is a schematic parts exploded isometric view of the sous vide appliance portion of FIG. 38.
Figure 46:
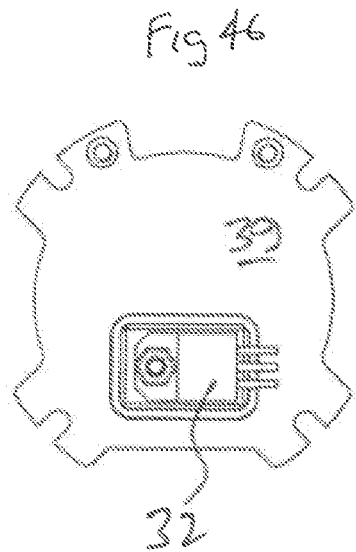
FIG. 46 is a schematic top plan view of the sous vide appliance portion of FIG. 44.
Figure 49:
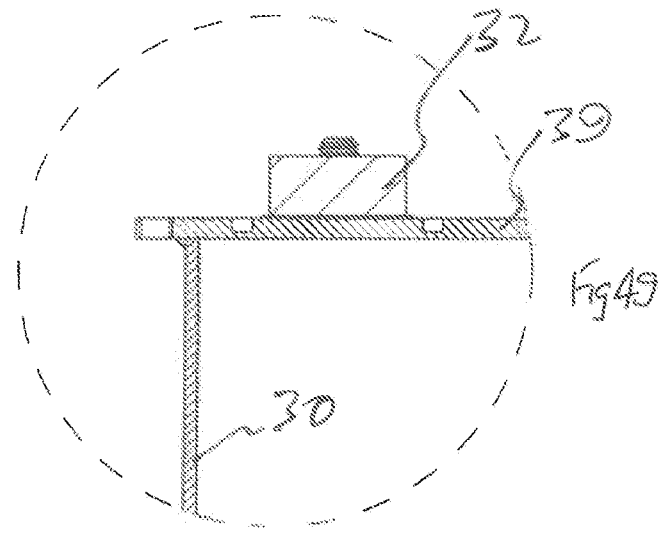
FIG. 49 is a schematic enlarged view of the portion 49 identified in FIG. 48.
Figure 47:
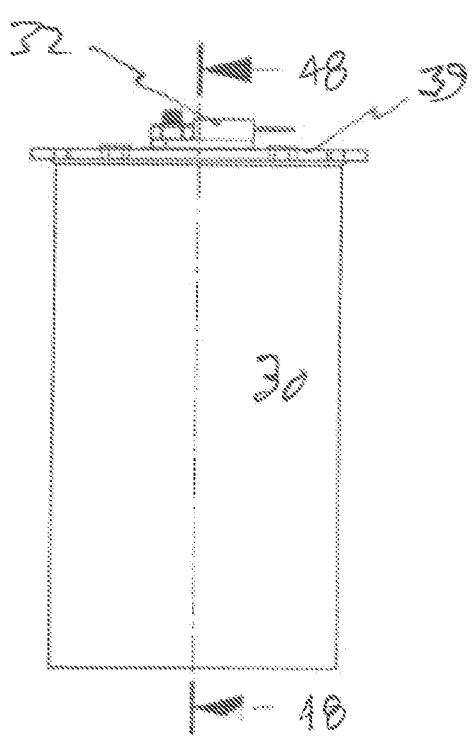
FIG. 47 is a schematic side elevation of the sous vide appliance portion of FIG. 44.
Figure 48:
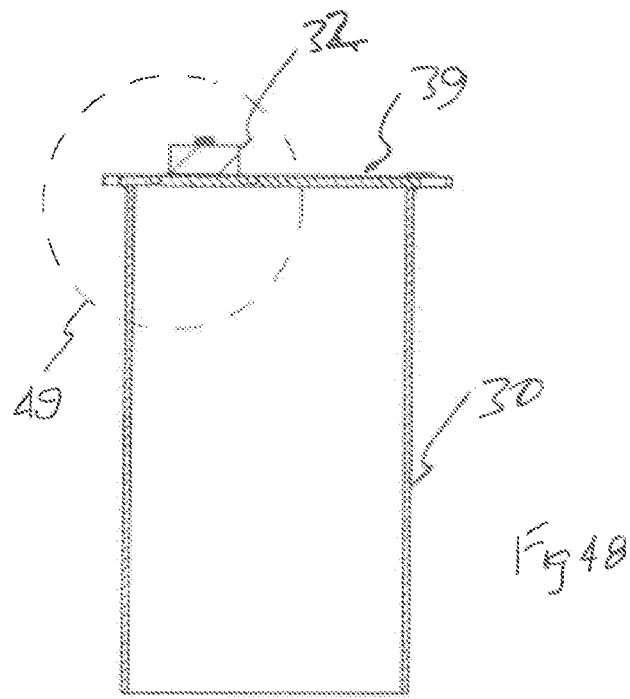
FIG. 48 is a schematic sectioned side elevation of the sous vide appliance portion as shown in FIG. 47 sectioned along the line 48-48.

In the embodiment of FIGS. 38 and 39, there is fixed (welded) to the tubular member 30, a mounting body 69, while there is also fixed to the tubular member 30 a threaded projection 70. The mounting body 69 is of a "U" configuration, so as to receive the switch 32 secured in position by the threaded projection 70 passing through an aperture in the switch 32 to engage a nut 71.

As shown in FIGS. 40 to 43, the switch 32 is attached to a mounting (heat sink) 78 attached and at least partly located between the inner tube 30 and housing 11.

In the embodiment of FIGS. 44 to 49, the switch 32 is mounted on the transverse wall so that liquid flowing along the path 26 and adjacent the wall 39 aids in cooling the switch 32. However the switch 32 is isolated from the flow by the wall 39.

In the embodiment of FIGS. 50 to 53, the switch 32 is mounted on the tubular member 30 but is firmly isolated therefrom by means of the insulation member 44. The insulation member 44 has an aperture 72 that exposes the switch 32 to liquid flow along the path 26 to aid in cooling the switch 32. The switch 32 is externally threaded so as to have a threaded length 73 threadably engaged in the insulation member 44.

The insulation member 44 is secured to the tubular member 35 by threaded fasteners 75 engaging nuts 76 fixed to the tubular member 35.

A gasket 74 is sandwiched between the member 44 and the member 30 to sealingly mount the member 44 with respect to the member 30.

The switch 32 is mounted on the heat sink 33 as previously described.

In the above described preferred embodiments, the heating element 31 is applied to the inner tube 19. In an alternative configuration, as illustrated in FIGS. 55 and 56, the heating element 31 can be replaced with a heating coil 77 located in the outer duct 22.

In the embodiment of FIGS. 54 and 55, the switch 32 is mounted on the wall 39.

In the above described preferred embodiments, the switch 32 is thermally isolated from the inner tube 19 upon which the heating element 31 is located.

Figure 57:
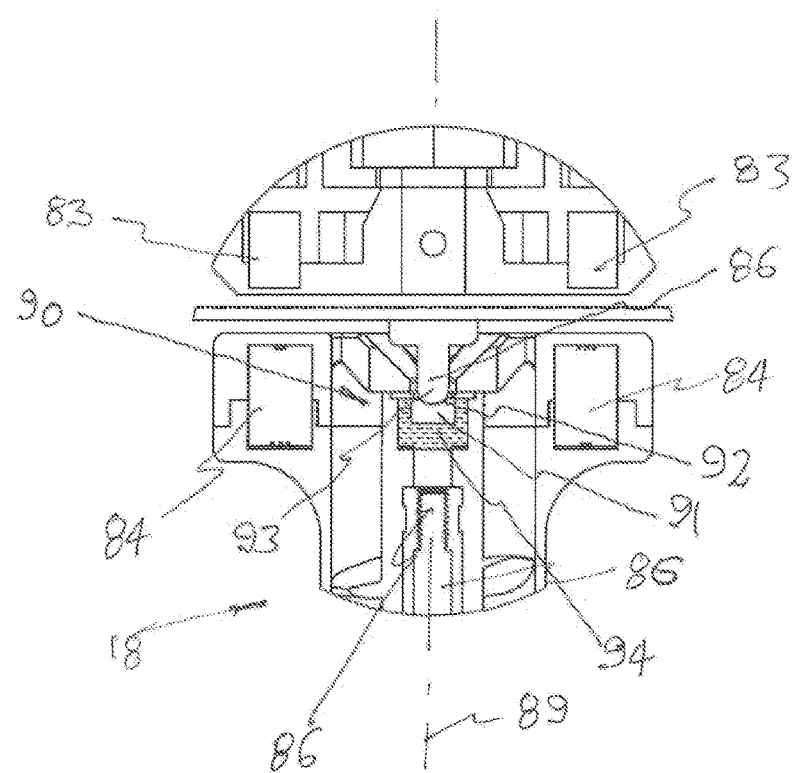
FIG. 57 is a schematic enlarged sectioned side elevation of portion of the appliance of FIG. 56.
Figure 56:
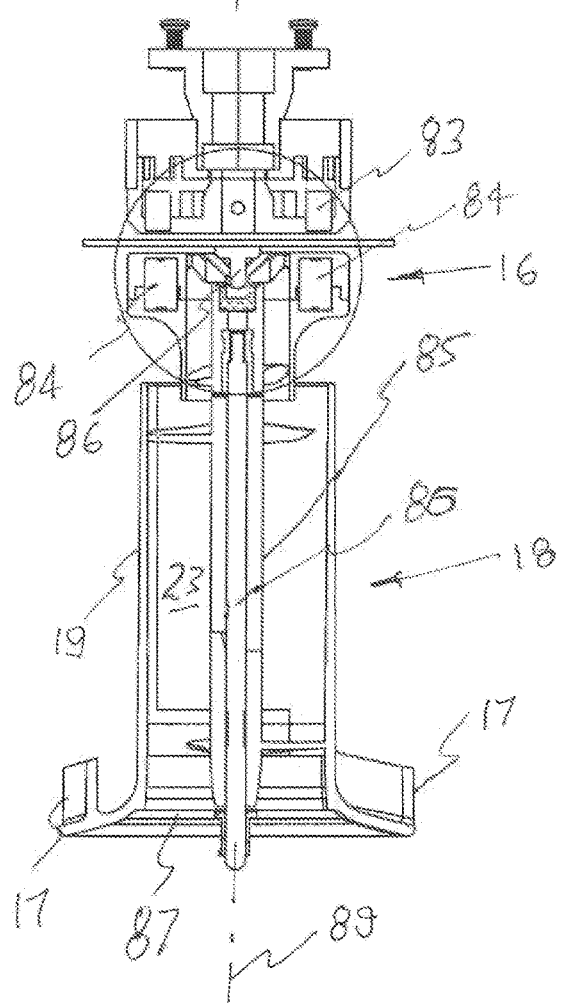
FIG. 56 is a schematic sectioned side elevation of an alternative construction of portion of the sous vide appliance of FIG. 1.

In the embodiment of FIGS. 56 and 57, the impeller assembly 18 includes a bearing assembly 90 that engages the shaft 86 so that the impeller assembly 18 can rotate about the axis 89. In this respect it should be appreciated the magnets 83 and 84 are attracted so that the assembly 18 is held against the shaft 86. However, the assembly 18 can be removed by applying a force thereto in a direction away from the shaft 86.

The bearing assembly 90 includes a jewel bearing member 91 that has a concave cavity 92 into which the arcuate end extremity 93 of the shaft 86 is received. In that respect the end extremity 93 has a convex surface to match the cavity 92.

Preferably, the jewel bearing member 91 is a ruby bearing.

Preferably, the bearing 91 is fixed to the upper end of the shaft 86 by means of a resilient bearing member 94, that would typically be an elastomer. The bearing element 94 aids in absorbing shock so as to minimise shock forces applied to the bearing element 91.

In the embodiment of FIGS. 58 and 59, there is illustrated an alternative construction for the outer tube 12.

In this embodiment the heating element 31 is applied to the tubular member 30 so as to not be applied to an area 95 of the tubular member 30, to which the switch 32 could be secured. In this manner, heat generated by the heating element 31 is inhibited from heating the switch 32.

Additionally, the heating element 31 has longitudinally extending portions 96 that co-operates with a temperature sensor 98. The temperature sensor 98 senses temperature sends a signal indicative of the temperature adjacent the projections 96 via two conductive elements 97 that extend to adjacent the projections 96. This arrangement provides for faster response in respect of the temperature sensor. As an alternative the switch 32 could be mounted on the housing 11, adjacent the areas, again to at least inhibit heat transfer to the switch 32.

The invention claimed is:

1. A sous vide appliance for cooking food in a bath of liquid, the sous vide appliance including:
    a housing, wherein the housing includes an inlet and an outlet;
    an impeller assembly to cause liquid to flow from the inlet to the outlet;
    a heater located within the housing;
    a heat sink located within the housing; and
    a switch secured to the heat sink and operatively associated with the heater to provide for the delivery of electric power to the heater so as to heat liquid passing thereby,
    wherein the switch is arranged to be conductively cooled by the liquid, and
    wherein the switch is thermally isolated from the heater.

2. The sous vide appliance according to claim 1, further including an insulator located between the switch and the heat sink.

3. The sous vide appliance according to claim 1, further including an insulating member to at least assist in thermally isolating the switch from the heater.

4. The sous vide appliance according to claim 1, wherein the heat sink has an arcuate surface, and the arcuate surface of the heat sink abuts an internal surface of the housing, further wherein the heat sink draws heat from the switch and conductively delivers heat to the housing.

5. The sous vide appliance according to claim 1, wherein the heat sink is formed from aluminium.

6. The sous vide appliance according to claim 1, further including a mounting body, and the mounting body is configured to receive the switch.

7. The sous vide appliance according to claim 1, wherein the heater includes a heating coil or the heater has a tubular or cylindrical configuration.

8. The sous vide appliance according to claim 1, wherein the switch is a triac switch.

9. The sous vide appliance according to claim 1, wherein the heater is adapted to heat the liquid passing along a liquid flow path from the inlet to the outlet.

10. The sous vide appliance according to claim 1, wherein the heater is not located in an area at which the switch is located so as to assist in maintaining switch temperature within predetermined limits.

11. A sous vide appliance including:
    a heater;
    a housing to which is mounted a motor, wherein the motor is fluidically sealed from the heater, and a switch; and
    the switch mounted to an inner surface of the housing and operatively associated with the heater to provide for the delivery of electric power to the heater so as to heat liquid passing thereby,
    wherein the switch is arranged to be conductively cooled by the liquid, and
    wherein the switch is thermally isolated from the heater.

12. The sous vide appliance of claim 11, wherein the heater is secured to a tubular member, and wherein an end portion of the tubular member is closed to thereby separate the tubular member from the housing, or the housing includes a flange that is secured to the end portion of the tubular member to isolate the motor from the tubular member.

13. The sous vide appliance of claim 11, further including a heat sink mounted to the housing.

14. The sous vide appliance according to claim 11, wherein the switch is a triac switch.

15. The sous vide appliance according to claim 11, wherein the heat sink has an arcuate surface.

16. The sous vide appliance according to claim 11, wherein the heat sink draws heat from the switch and conductively delivers heat to an outer housing of the sous vide appliance for dissipation therefrom.

17. A sous vide appliance including:
    a housing;
    a heater located within the housing;
    a heat sink located within the housing; and
    a switch secured to the heat sink and operatively associated with the heater to provide for the delivery of electric power to the heater so as to heat liquid passing thereby,
    wherein the heat sink has an arcuate surface that abuts an internal surface of the housing, and
    wherein the switch is thermally isolated from the heater.

18. The sous vide appliance according to claim 17, further including an insulator located between the switch and the heat sink.

19. The sous vide appliance according to claim 17, further including an insulating member to at least assist in thermally isolating the switch from the heater.

20. The sous vide appliance according to claim 17, wherein the heat sink is formed from aluminium.

21. The sous vide appliance according to claim 17, wherein the switch is a triac switch.

22. The sous vide appliance according to claim 17, wherein the housing includes an inlet and an outlet located adjacent the inlet, and the heater is adapted to heat the liquid passing along a liquid flow path from the inlet to the outlet.

23. The sous vide appliance according to claim 17, wherein the heater has a tubular or cylindrical configuration or the heater includes a heating coil.

\* \* \* \* \*